(12) United States Patent
Di Fabbrizio et al.

(10) Patent No.: US 11,176,942 B2
(45) Date of Patent: Nov. 16, 2021

(54) MULTI-MODAL CONVERSATIONAL AGENT PLATFORM

(71) Applicant: Vui, Inc., Boston, MA (US)

(72) Inventors: Giuseppe Di Fabbrizio, Brookline, MA (US); Evgeny Stepanov, Povo (IT); Giuliano Tortoreto, Cavedine (IT); Mehool Patel, Andover, MA (US); Phil C. Frank, Cohasset, MA (US)

(73) Assignee: VUI, INC., Boston, MA (US)

( * ) Notice: Subject to any disclaimer, the term of this patent is extended or adjusted under 35 U.S.C. 154(b) by 0 days.

(21) Appl. No.: 16/696,482

(22) Filed: Nov. 26, 2019

(65) Prior Publication Data

US 2021/0158811 A1    May 27, 2021

(51) Int. Cl.
*G10L 21/00* (2013.01)
*G10L 25/00* (2013.01)
(Continued)

(52) U.S. Cl.
CPC .............. *G10L 15/22* (2013.01); *G06F 16/36* (2019.01); *G06N 20/00* (2019.01);
(Continued)

(58) Field of Classification Search
CPC ..... G10L 15/1815; G10L 15/22; G10L 15/07; G10L 2015/223; G10L 15/183; G10L 13/027; G10L 15/19; G10L 15/26; G10L 17/22; G10L 2015/228; G10L 15/30; G10L 15/18; G10L 15/00; G10L 15/063; G10L 2015/225; G10L 15/265; G10L 15/32; G10L 13/00; G10L 13/02; G10L 13/043; G10L 15/08; G10L 2015/088; G10L 25/63; G10L 21/06; G10L 15/005; G10L 15/02; G10L 17/005; G10L 17/02; G10L 17/06; G10L 17/24; G10L 19/008; G10L 19/167; G10L 2015/025; G10L 2015/221; G10L 2015/226; G10L 2015/227; G10L 2021/02165; G10L 21/02; G10L 21/0232;
(Continued)

(56) References Cited

U.S. PATENT DOCUMENTS 7,421,393 B1 *   9/2008   Di Fabbrizio .......... G10L 15/28
                                                         704/275
7,869,998 B1 *   1/2011   Di Fabbrizio .......... G10L 13/00
                                                         704/1

(Continued)

*Primary Examiner* — Michael Ortiz-Sanchez
(74) *Attorney, Agent, or Firm* — Mintz, Levin, Cohn, Ferris, Glovsky and Popeo, P.C.

(57) ABSTRACT

A method includes receiving data characterizing an utterance of a query associated with a tenant; providing, to an automated speech recognition engine, the received data and a profile selected from a plurality of profiles based on the tenant, the profile configuring the automated speech recognition engine to process the received data; receiving, from the automated speech recognition engine, a text string characterizing the query; and processing, via an ensemble of natural language agents configured based on the tenant, the text string characterizing the query to determine a textual response to the query, the textual response including at least one word from a first lexicon associated with the tenant. Related systems, methods, apparatus, and computer readable mediums are also described.

29 Claims, 9 Drawing Sheets

(51) Int. Cl.
| | | |
|---|---|---|
| *G10L 15/22* | (2006.01) | |
| *G06N 20/00* | (2019.01) | |
| *G06F 16/36* | (2019.01) | |
| *G06Q 30/06* | (2012.01) | |
| *G10L 13/00* | (2006.01) | |
| *G10L 15/06* | (2013.01) | |
| *G10L 15/18* | (2013.01) | |
| *G06Q 30/00* | (2012.01) | |

(52) U.S. Cl.
CPC ..... *G06Q 30/0603* (2013.01); *G06Q 30/0641* (2013.01); *G10L 13/00* (2013.01); *G10L 15/063* (2013.01); *G10L 15/1815* (2013.01); *G06Q 30/016* (2013.01); *G10L 2015/223* (2013.01)

(58) Field of Classification Search
CPC . G10L 21/0272; G10L 25/87; G10L 15/1822; G06F 2203/0381; G06F 3/167; G06F 40/40; G06F 3/0481; G06F 3/16; G06F 40/30; G06F 16/90332; G06F 16/33; G06F 40/20; G06F 40/30; G06F 21/32; G06F 3/011; G06F 3/165; G06F 16/43; G06F 3/012; G06F 3/013; G06F 3/017; G06F 3/0482; G06F 3/1204; G06F 16/313; G06F 16/3329; G06F 16/358; G06F 30/13; G06F 3/04817; G06F 3/04842; G06F 3/0488; G06F 3/1205; G06F 3/1253; G06F 40/295; G06F 11/1448; G06F 11/1458; G06F 11/1469; G06F 11/2089; G06F 11/2094; G06F 16/122; G06F 16/13; G06F 16/134; G06F 16/1824; G06F 16/243; G06F 16/24522; G06F 16/2455; G06F 16/24575; G06F 16/25; G06F 16/3337; G06F 16/334; G06F 16/3344; G06F 16/36; G06F 16/90335; G06F 16/9035; G06F 16/94; G06F 16/953; G06F 16/9537; G06F 16/9566; G06F 19/00; G06F 19/3418; G06F 19/36; G06F 1/163; G06F 1/1698; G06F 1/3231; G06F 2009/45562; G06F 21/50; G06F 21/6218; G06F 21/6245; G06F 2201/805; G06F 2201/815; G06F 2201/82; G06F 2201/84; G06F 2203/04101; G06F 2203/04804; G06F 3/014; G06F 3/02; G06F 3/0304; G06F 3/0346; G06F 3/0484; G06F 3/04845; G06F 3/04847; G06F 3/0486; G06F 3/04883; G06F 3/0613; G06F 3/0646; G06F 3/0647; G06F 3/065; G06F 3/0659; G06F 3/067; G06F 3/1206; G06F 3/1238; G06F 3/1258; G06F 3/126; G06F 3/1268; G06F 3/1275; G06F 3/162; G06F 40/279; G06F 40/289; G06F 40/47; G06F 40/58; G06F 8/61; G06F 8/65; G06F 9/453; G06F 9/45558; G06F 9/468; G06F 9/4862; G06F 9/54; G06F 40/205; G06F 3/048; G06K 2209/27; H04M 3/4936; H04M 2201/40; H04M 2250/74; H04M 3/00; H04M 3/493; H04M 3/4938; G06Q 10/107; G06Q 10/109; G06Q 30/02; G06Q 50/10; G06Q 20/00; G06Q 20/10; G06Q 20/202; G06Q 20/209; G06Q 30/0269; G06Q 30/0277; G06Q 30/02; G06Q 30/00; G06Q 30/0201; G06Q 30/0203; G06N 20/00; H04L 67/10; H04L 67/20; H04L 67/28; H04L 67/42; H04L 67/1097

See application file for complete search history.

(56) References Cited

U.S. PATENT DOCUMENTS

| | | | |
|---|---|---|---|
| 10,002,126 B2 * | 6/2018 | Grosset | G06F 16/353 |
| 10,115,393 B1 * | 10/2018 | Kumar | G10L 15/07 |
| 10,284,541 B1 * | 5/2019 | Subramanian | G06N 20/00 |
| 2004/0054534 A1 * | 3/2004 | Junqua | G10L 13/033 |
| | | | 704/258 |
| 2008/0184164 A1 * | 7/2008 | Di Fabbrizio | G10L 15/22 |
| | | | 715/809 |
| 2009/0187410 A1 * | 7/2009 | Wilpon | G10L 15/22 |
| | | | 704/270.1 |
| 2012/0265528 A1 * | 10/2012 | Gruber | G10L 15/18 |
| | | | 704/235 |
| 2014/0040748 A1 * | 2/2014 | Lemay | G06F 3/167 |
| | | | 715/728 |
| 2016/0259775 A1 | 9/2016 | Gelfenbeyn et al. | |
| 2017/0060868 A1 * | 3/2017 | Rais Ghasem | G06F 16/243 |
| 2017/0228367 A1 | 8/2017 | Pasupalak et al. | |
| 2017/0344481 A1 * | 11/2017 | Pack, III | G06F 16/00 |
| 2017/0366621 A1 * | 12/2017 | Sagar | H04L 67/148 |
| 2018/0040324 A1 * | 2/2018 | Wilberding | G10L 15/22 |
| 2018/0102983 A1 * | 4/2018 | Chaudhari | H04L 67/10 |
| 2018/0143967 A1 | 5/2018 | Anbazhagan et al. | |
| 2018/0277113 A1 * | 9/2018 | Hartung | G10L 15/30 |
| 2018/0314689 A1 * | 11/2018 | Wang | G06F 40/58 |
| 2018/0330455 A1 * | 11/2018 | Bayyapu | G06F 40/49 |
| 2019/0037036 A1 * | 1/2019 | Sunkara | H04L 51/02 |
| 2019/0147068 A1 * | 5/2019 | Tuggle | G06F 16/252 |
| | | | 707/793 |
| 2019/0279632 A1 * | 9/2019 | Kim | G10L 15/22 |
| 2019/0287516 A1 * | 9/2019 | Mishra | G10L 17/00 |
| 2019/0332433 A1 * | 10/2019 | Nadimpalli | G06F 9/50 |
| 2019/0371296 A1 * | 12/2019 | Iwase | G06F 40/20 |
| 2020/0020334 A1 * | 1/2020 | Kang | G10L 15/22 |
| 2020/0027447 A1 * | 1/2020 | King | G06F 3/167 |
| 2020/0349920 A1 * | 11/2020 | Al Bawab | G06F 40/20 |

\* cited by examiner

MULTI-MODAL CONVERSATIONAL AGENT PLATFORM

BACKGROUND

Conversational agents can interact directly with users via voice or text modalities. A conversational agent and a user can exchange information with each other in a series of steps to fulfill a specific goal or objective of the user. The exchange of information can form a dialog between the conversational agent and the user. Information supplied by the user during one or more steps of the dialog can be processed by a system in which the conversational agent is configured and deployed to provide contextually relevant outputs relating to each of the dialog steps. In this way, the system can generate statements and/or questions during the dialog with the user in a contextually accurate and efficient manner with regard to the specific goal or objective of the user.

Conversational agents can be utilized in e-commerce applications to allow a retail or service provider entity to interact with potential or existing customers in regard to a product or service without requiring a human customer support operator. Conversational agents can process data received in a variety of modalities, such as voice, text, and/or web site interactions. Conversational agents can also process data received from a variety of input devices, such as computing devices, which may for example display a website of an e-commerce retailer, a browser-enabled smartphone or mobile computing device, as well as intelligent or virtual personal assistant devices.

SUMMARY

In an aspect, a method includes receiving data characterizing an utterance of a query associated with a tenant; providing, to an automated speech recognition engine, the received data and a profile selected from a plurality of profiles based on the tenant, the profile configuring the automated speech recognition engine to process the received data; receiving, from the automated speech recognition engine, a text string characterizing the query; and processing, via an ensemble of natural language agents configured based on the tenant, the text string characterizing the query to determine a textual response to the query, the textual response including at least one word from a first lexicon associated with the tenant.

One or more of the following features can be included in any feasible combination. For example, the method can include providing, to a text-to-speech synthesis engine, the textual response and the profile; receiving, from the text-to-speech synthesis engine, a verbalized query response determined by the text-to-speech synthesis engine based on the textual response; and providing the verbalized query response. The method can include providing a first configuration of a graphical user interface on a first client device based on the profile, the client device configured to receive the utterance from a user. Processing the text string characterizing the query can include generating a sematic interpretation associated with the text string, the semantic interpretation generated using at least one of a plurality of classification algorithms trained using a first machine learning process associated with the tenant; determining a first contextual sequence associated with text string based on one or more previously processed text strings; generating a first response action based on the determined first contextual sequence; and generating the textual response based on the generated first response action.

The semantic interpretation can be generated using a first data structure representing the first lexicon associated with the tenant. The first data structure can be generated based on at least one of: a catalog of items associated with the tenant and including a first item title and a first item description; one or more reviews associated with a first item; interactive user data associated with a first item; or a combination thereof. Generating the first data structure can include determining one or more attributes associated with a first item from the catalog of items; determining one or more synonyms associated with the first item from the catalog of items; determining one or more referring expressions associated with the first item from the catalog of items and/or the interactive user data associated with the first item; generating the first data structure based on the determining steps, the first data structure including a name, one or more attributes, one or more synonyms, one or more referring expressions, and/or one or more dialogs corresponding to the first item. The first data structure can be used in the first machine learning process to train the at least one of a plurality of classification algorithms.

The method can include receiving second data characterizing an utterance of a query associated with a second tenant; providing, to a second automated speech recognition engine, the received second data and a profile selected from a plurality of profiles based on the second tenant, the profile configuring the second automated speech recognition engine to process the received second data; receiving, from the automated speech recognition engine, a text string characterizing the query; and processing, via the ensemble of natural language agents configured based on the second tenant, the text string characterizing the query to determine a textual response to the query, the textual response including at least one word from a second lexicon associated with the second tenant.

The utterance of the query can include a plurality of natural language words spoken by a user and received by an input device of a first computing device. The utterance of the query can be provided by the user in regard to a first context associated with a first item provided by the tenant. The profile can include one or more configuration settings associated with the ensemble of natural language agents configured on a server including a data processor, one or more configuration settings associated with an ensemble of natural language agents configured on the first computing device, and one or more configuration settings specifying one or more speech processing engines configured on the server including the data processor.

The tenant can include at least one of a retail entity, a service provider entity, a financial entity, a manufacturing entity, an entertainment entity, an information storage entity, and a data processing entity.

The automated speech recognition engine can be configured to receive audio data corresponding to the utterance of the query and to generate, in response to the receiving, the text string including textual data corresponding to the received audio data, the automatic speech recognition engine being selected from one or more inter-changeable speech processing engines included in the profile. The text-to-speech synthesis engine can be configured to receive the textual response, and to generate, in response to the receiving, the verbalized query response including audio data corresponding to the received textual response, the text-to-speech synthesis engine being selected from one or more inter-changeable speech processing engines included in the profile. The method can include receiving, prior to receiving data characterizing the utterance of the query, an input to a web site provided via a web browser configured on first computing device, the input causing the web browser to be authenticated and registered at a second computing device coupled to the first computing device via a network.

The method can include receiving, by the second computing device, validation data associated with the first computing device, the validation data including audio and graphical rendering settings configured on with the first computing device; generating, in response to confirming the validation data, an initial conversation prompt by the second computing device and providing the initial conversation prompt to the web site configured on the first computing device; receiving, at an input device coupled to the first computing device and in response to providing the initial conversation prompt via the web site, the data characterizing the utterance of the query, the query associated with an item available via the web site; transmitting the provided verbalized query response to the first computing device; and providing the verbalized query response to the user via an output device coupled to the first computing device. The data characterizing the utterance of the query associated with the tenant can be provided via a textual interaction modality or via a speech interaction modality.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

DESCRIPTION OF DRAWINGS

These and other features will be more readily understood from the following detailed description taken in conjunction with the accompanying drawings, in which.

Figure 1:
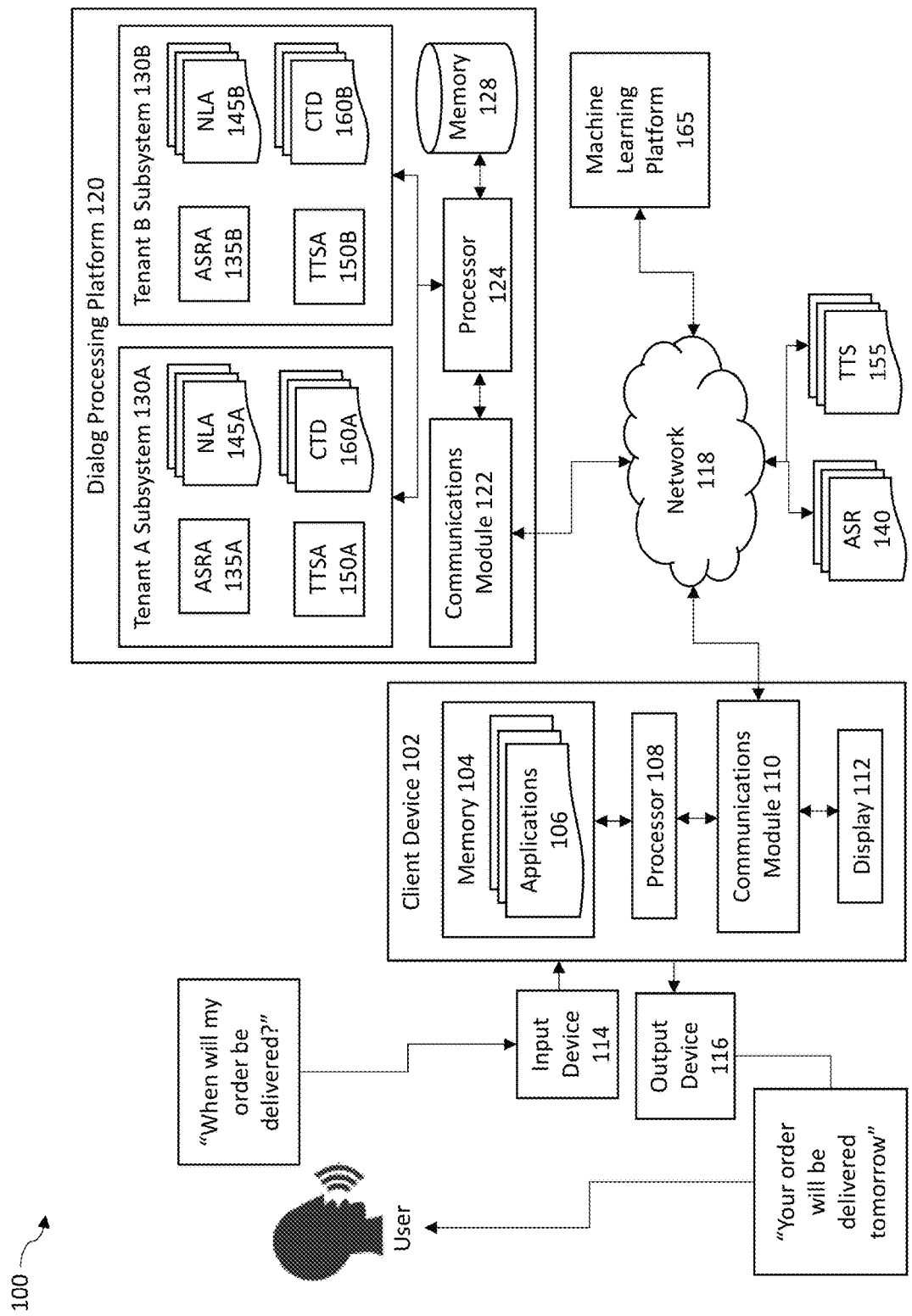
FIG. 1 illustrates an example architecture of a system including a dialog processing platform, a client device configured as a multi-modal conversational agent, and a machine learning platform.

It is noted that the drawings are not necessarily to scale. The drawings are intended to depict only typical aspects of the subject matter disclosed herein, and therefore should not be considered as limiting the scope of the disclosure.

DETAILED DESCRIPTION

Advances in natural language processing have enabled a proliferation of digital endpoint devices capable of providing voice recognition capabilities. Personal and mobile computing devices, intelligent or virtual assistant devices, televisions, and even automobiles, can receive voice-based inputs, often in addition to text-based inputs, and to process the inputs in regard to a specific user objective or goal. A multi-modal conversational agent can be configured on or within these digital endpoint devices to receive voice or text-based inputs and to process the inputs in the context of a dialog with the user. A user can interact with the conversational agent in a dialog about a product offered by a retail or manufacturing entity; a service provided by a service provider such as an insurance company or a medical facility; or a transaction by a financial or banking entity; and/or the like.

The backend architectures coupled to the conversational agents and which can receive and process user dialog data from the digital endpoint devices, can include closed, proprietary interfaces. As a result, the backend architectures coupled to many conversational agents deployed in a variety of digital endpoint devices cannot be easily extended or reconfigured to process a wider variety of endpoint devices, user queries and dialogs beyond those that the conversational agent and corresponding backend architecture were originally designed to process. For example, a backend architecture coupled to a conversational agent associated with an endpoint device that can receive textual dialog inputs may be unable to process verbal dialog inputs. Additionally, a backend architecture coupled to a conversational agent associated with a retail entity may be unable to process textual or voice dialog data associated with an entertainment entity or a financial services entity. Similarly, a backend architecture associated with a conversational agent deployed in a customer support function of a retail entity may be unable to process user dialog inputs corresponding to new items or updated pricing in a catalog of the retail entity.

Many conversational agent architectures do not provide the flexibility to mix-and-match different speech or natural language processing resources. For instance, existing conversational agent architectures may not provide a means for configuring and deploying new, updated, or alternate speech processing and/or nor natural language understanding resources. The speech or language processing resources of many conversational agent architectures are integrated within the architecture and are not replaceable with alternate natural language processing resources. In addition, even if new resources could be added, many conversation agent architectures cannot support or be reconfigured to support new digital endpoint devices that are part of the conversational agent architecture as originally designed. For example, a conversational agent backend architecture may be configured to process textual dialog inputs provided to a conversational agent utilized in a website. The backend architecture may be able to process the textual inputs provided by a user via a keyboard of a mobile or personal computing device at which the user is viewing the website. However, the backend architecture may be unable to process voice inputs provided via a microphone of the mobile or personal computing device. The lack of re-configurability and modularity of backend architectures limits the use of existing conversational agent systems to support new digital endpoint devices, new natural language processing resources, and new lexicons. The inability to efficiently configure and deploy new processing resources in conversational agent frontend and backend architectures can reduce user engagement, customer satisfaction, and revenue for the entities deploying the conversational agent.

In some implementations, the conversational agent frontend and backend architecture described herein allow entities deploying conversational agents to configure and/or reconfigure natural language processing resources that best suit the application or application domain. The conversational agent frontend and backend architecture described herein can also enable entities deploying conversation agents to support a broader variety of user input/output devices that are not necessarily from the same technology provider or originally intended to operate with a particular conversational agent backend. The conversational agent frontend and backend architecture described herein includes components that can easily integrate multiple input modalities provided via smartphones with multi-touch and keyboard capabilities, and also includes backend adaptors or connectors to simplify the user's authentication and to provide access to backend application programming interfaces (API) from different frontend device or application configurations.

Accordingly, example conversational agent systems described herein enable system operators to replace or change backend components without altering the client user interface or other client side processing implementations for speech and/or textual agent modalities. This can be especially beneficial when changing audio streaming configurations to adapt to different speech providers. The example conversational agent systems described herein can reduce client-side incompatibilities when configuring new or alternate backend language processing resources. In this way, the client-side interfaces and implementations remain unchanged regardless of which natural language processing components or resources are used.

For example, the conversational agent frontend and backend architecture described herein can provide a modular, configurable architecture for use in a variety of domains. The improved conversational agent architecture described herein can include components to automatically extract information from a variety of domain resources such as user data, website interaction data, product and/or services data, as well as customer order and billing data can be used to train one or more components of the multi-modal conversational agent architecture described herein. The conversational agent architecture described herein can utilize the extracted information to automatically generate synonyms for the names and characterizations of the products and/or services which can then be used in dialog sequences with a user of the conversational agent. The conversational agent architecture described herein can also generate search indexes optimized for user inputs, as well as enhanced models used for natural language processing and dialog management. In this way, conversational agent architecture described herein can more accurately capture and utilize a domain specific lexicon to provide users with a more focused, satisfying and robust dialog experience via the conversational agent.

FIG. 1 illustrates an example architecture of a conversational agent system 100 including a client device 102, a dialog processing platform 120, and a machine learning platform 165. The client device 102, the dialog processing platform 120, and the machine learning platform 165 can be communicatively coupled via a network, such as network 118. In broad terms, a user can provide an input associated with a query to the client device 102 via input device 114. The client device 102 can include a frontend of the conversational agent system 100. A conversational agent can be configured on the client device 102 as one or more applications 106. The conversational agent can transmit data associated with the query to a backend of the conversational agent system 100. The dialog processing platform 120 can be configured as the backend of the conversational agent system 100 and can receive the data from the client device 102 via the network 118. The dialog processing platform 120 can process the transmitted data to generate a response to the user query and can provide the generated response to the client device 102. The client device 102 can then output the query response via the output device 116. A user may iteratively provide inputs and receive outputs via the conversational agent system 100 in a dialog. The dialog can include natural language units, such as words, which can be processed and generated in the context of a lexicon that is associated with the domain of the subsystem for which the conversational agent system 100 has been implemented.

As shown in FIG. 1, the conversational agent system 100 includes a client device 102. The client device 102 can include a large-format computing device or any other fully functional computing device, such as a desktop computers or laptop computers, which can transmit user data to the dialog processing platform 120. Additionally, or alternatively, other computing devices, such as a small-format computing devices 102 can also transmit user data to the dialog processing platform 120. Small-format computing devices 102 can include a tablet, smartphone, intelligent or virtual digital assistant, or any other computing device configured to receive user inputs as voice and/or textual inputs and provide responses to the user as voice and/or textual outputs.

The client device 102 includes a memory 104, a processor 108, a communications module 110, and a display 112. The memory 104 can store computer-readable instructions and/or data associated with processing multi-modal user data via a frontend and backend of the conversational agent system 100. For example, the memory 104 can include one or more applications 106 implementing a conversational agent frontend. The applications 106 can provide speech and textual conversational agent modalities to the client device 102 thereby configuring the client device 102 as a digital or telephony endpoint device. The processor 108 operates to execute the computer-readable instructions and/or data stored in memory 104 and to transmit the computer-readable instructions and/or data via the communications module 110. The communications module 110 transmits the computer-readable instructions and/or user data stored on or received by the client device 102 via network 118. The network 118 connects the client device 102 to the dialog processing platform 120. The network 118 can also be configured to connect the machine learning platform 165 to the dialog processing platform 120. The network 118 can include, for example, any one or more of a personal area network (PAN), a local area network (LAN), a campus area network (CAN), a metropolitan area network (MAN), a wide area network (WAN), a broadband network (BBN), the Internet, and the like. Further, the network 118 can include, but is not limited to, any one or more of the following network topologies, including a bus network, a star network, a ring network, a mesh network, a star-bus network, tree or hierarchical network, and the like. The client device 102 also includes a display 112. In some implementations, the display 112 can be configured within or on the client device 102. In other implementations, the display 112 can be external to the client device 102. The client device 102 also includes an input device 114, such as a microphone to receive voice inputs, or a keyboard, to receive textual inputs. The client device 102 also includes an output device 116, such as a speaker or a display.

The client device 102 can include a conversational agent frontend, e.g., one or more of applications 106, which can receive inputs associated with a user query and to provide responses to the users query. For example, as shown in FIG. 1, the client device 102 can receive user queries which are uttered, spoken, or otherwise verbalized and received by the input device 114, such as a microphone. In some implementations, the input device 114 can be a keyboard and the user can provide query data as a textual input, in addition to or separately from the inputs provided using a voice-based modality. A user can interact with the input device 114 to provide dialog data, such as a query, via an e-commerce web-site at which the user previously placed an order. For example, the user can provide a query asking "When will my order be delivered?". The conversational agent 106 configured on the client device 102 can receive the query via the input device 114 and cause processor 108 to transmit the query data to the dialog processing platform 120 for processing. Additional detail of the client device 102 and the conversational agent frontend applications 106 will be provided in the description of FIG. 2.

As shown in FIG. 1, the conversational agent system 100 includes a dialog processing platform 120. The dialog processing platform 120 operates to receive dialog data, such as user queries provided to the client device 102, and to process the dialog data to generate responses to the user provided dialog data. The dialog processing platform 120 can be configured on any device having an appropriate processor, memory, and communications capability for hosting the dialog processing platform as will be described herein. In certain aspects, the dialog processing platform can be configured as one or more servers, which can be located on-premises of an entity deploying the conversational agent system 100, or can be located remotely from the entity. In some implementations, the distributed processing platform 120 can be implemented as a distributed architecture or a cloud computing architecture. In some implementations, one or more of the components or functionality included in the dialog processing platform 120 can be configured in a microservices architecture. In some implementations, one or more components of the dialog processing platform 120 can be provided via a cloud computing server of an infrastructure-as-a-service (IaaS) and be able to support a platform-as-a-service (PaaS) and software-as-a-service (SaaS) services.

The dialog processing platform 120 includes a communications module 122 to receive the computer-readable instructions and/or user data transmitted via network 118. The dialog processing platform 120 also includes one or more processors 124 configured to execute instructions that when executed cause the processors to perform natural language processing on the received dialog data and to generate contextually specific responses to the user dialog inputs using one or more interchangeable and configurable natural language processing resources. The dialog processing platform 120 also includes a memory 128 configured to store the computer-readable instructions and/or user data associated with processing user dialog data and generating dialog responses. The memory 128 can store a plurality of profiles associated with each tenant or entity. The profile can configure one or more processing components of the dialog processing platform 120 with respect to the entity or tenant for which the conversational agent system 100 has been configured.

As shown in FIG. 1, the dialog processing platform 120 includes one or more subsystems such as subsystem 130A and 130B, collectively referred to as subsystems 130. Each subsystem 130 and the components or functionality configured therein can correspond to a particular entity, or tenant, that has configured the conversational agent system 100 to provide conversational agents to end users. For example, the dialog processing platform 120 can include a first subsystem 130A which can be associated with a first tenant 130A, such as retail entity, and a second subsystem 130B which can be associated with a second tenant 130B, such as a financial services entity. In this way, the dialog processing platform 120 can be configured as a multi-tenant portal to provide natural language processing for different tenants, and their corresponding conversational agent frontend applications 106, which can be configured on a variety of multi-modal digital endpoint client devices 102.

Subsystems 130 can include components implementing functionality to receive user dialog data from a variety of multi-modal conversational agents and to generate dialog responses in the context of a particular lexicon of a tenant or entity for which the conversational agent has been deployed. For example, as shown in FIG. 1 in regard to subsystem 130A, the components can include an automatic speech recognition engine adapter (ASRA) 135A for interfacing with a plurality of automated speech recognition (ASR) engines 140, a plurality of natural language agent (NLA) ensembles 145A, a text-to-speech synthesis engine adapter (TTSA) 150 for interfacing to a plurality of text-to-speech (TTS) synthesis engines 155, and a plurality of catalog-to-dialog (CTD) modules 160A. In some implementations, the dialog processing platform 120 can include one or more subsystems 130.

The plurality of ASR engines 140, the plurality of NLA ensembles 145, the plurality of TTS synthesis engines 155, and the plurality of CTD modules 160 can be respectfully referred to as ASR engines 140, NLA ensembles 145, TTS synthesis engines 155, and CTD modules 160. In some implementations, the subsystem 130 components can be configured directly within the dialog processing platform 120 such that the components are not configured within a subsystem 130. As shown in FIG. 1, the ASR engines 140 and the TTS synthesis engines 155 can be configured outside of the dialog processing platform 120, such as in a cloud-based architecture. The dialog processing platform 120 can exchange data with the ASR engines 140 and the TTS synthesis engines 155 via the ASRA 135 and the TTSA 150, respectfully. In some implementations, the ASR 140 and/or TTS 155, or portions thereof, can be configured within the dialog processing platform 120. In some implementations, the components of the dialog processing platform 120, as well as the ASR engines 140 and the TTS synthesis engines 155 can be implemented as microservices within a cloud-based or distributed computing architecture.

As shown in FIG. 1, the dialog processing platform 120 includes an ASRA 135A configured to interface with the ASR engines 140. The ASR engines 140 can include automated speech recognition engines configured to receive spoken or textual natural language inputs and to generate textual outputs corresponding the inputs. For example, the ASR engines 140 can process the user's verbalized query or utterance "When will my order be delivered?" into a text string of natural language units characterizing the query. The text string can be further processed to determine an appropriate query response. The dialog processing platform 120 can dynamically select a particular ASR engine 140 that best suits a particular task, dialog, or received user query.

The dialog processing platform 120 also includes a plurality of NLA ensembles 145. The NLA ensembles 145 can include a plurality of components configured to receive the text string from the ASR engines 140 and to process the text string in order to determine a textual response to the user query. The NLA ensembles 145 can include a natural language understanding (NLU) module implementing a number of classification algorithms trained in a machine learning process to classify the text string into a semantic interpretation. The processing can include classifying an intent of the text string and extracting information from the text string. The NLU module combines different classification algorithms and/or models to generate accurate and robust interpretation of the text string. The NLA ensembles 145 can also include a dialog manager (DM) module. The DM module can determine an appropriate dialog action in a contextual sequence formed by the current or previous dialog sequences conducted with the user. In this way, the DM can generate a response action to increase natural language quality and fulfillment of the user's query objective. The NLA ensembles 145 can also include a natural language generator (NLG) module. The NLG module can process the action response determined by the dialog manager and can convert the action response into a corresponding textual response. The NLG module provides multimodal support for generating textual responses for a variety of different output device modalities, such as voice outputs or visually displayed (e.g., textual) outputs. In some implementations, the ensemble can include a set of models that are included in the NLU and optimized jointly to select the right response.

The dialog processing platform 120 also includes a TTSA 150 configured to interface with the TTS synthesis engines 155. The TTS synthesis engines 155 can include text-to-speech synthesis engines configured to convert textual responses to verbalized query responses. In this way, a response to a user's query can be determined as a text string and the text string can be provided to the TTS synthesis engines 155 to generate the query response as natural language speech. The dialog processing platform 120 can dynamically select a particular TTS synthesis engine 155 that best suits a particular task, dialog, or generated textual response.

The dialog processing platform 120 also includes catalog-to-dialog (CTD) modules 160. The CTD modules 160 can be selected for use based on a profile associated with the tenant or entity. The CTD modules 160 can automatically convert data from a tenant or entity catalog, as well as billing and order information into a data structure corresponding to a particular tenant or entity for which the conversational agent system 100 is deployed. The CTD modules 160 can derive product synonyms, attributes, and natural language queries from product titles and descriptions which can be found in the tenant or entity catalog. The CTD modules 160 can generate a data structure that is used the machine learning platform 165 to train one or more classification algorithms included in NLU module. In some implementations, the CTD modules 160 can instantiate, create, or implement fully configured conversational agents configured to process user queries or dialog inputs for a tenant. In some implementations, the CTD modules 160 can be used to efficiently pre-configure the conversational agent system 100 to automatically respond to queries about orders and/or products or services provided by the tenant or entity. For example, referring back to FIG. 1, the dialog processing platform 120 can process the users query to determine a response regarding the previously placed order. As a result of the processing initially described above and to be described in more detail in relation to FIG. 3, the dialog processing platform 120 can generate a response to the user's query. The query response can be transmitted to the client device 102 and provided as speech output via output device 116 and/or provided as text displayed via display 112.

The conversational agent system 100 includes a machine learning platform 165. Machine learning can refer to an application of artificial intelligence that automates the development of an analytical model by using algorithms that iteratively learn patterns from data without explicit indication of the data patterns. Machine learning can be used in pattern recognition, computer vision, email filtering and optical character recognition and enables the construction of algorithms or models that can accurately learn from data to predict outputs thereby making data-driven predictions or decisions.

The machine learning platform 165 can include a number of components configured to generate one or more trained prediction models suitable for use in the conversational agent system 100 described in relation to FIG. 1. For example, during a machine learning process, a feature selector can provide a selected subset of features to a model trainer as inputs to a machine learning algorithm to generate one or more training models. A wide variety of machine learning algorithms can be selected for use including algorithms such as support vector regression, ordinary least squares regression (OLSR), linear regression, logistic regression, stepwise regression, multivariate adaptive regression splines (MARS), locally estimated scatterplot smoothing (LOESS), ordinal regression, Poisson regression, fast forest quantile regression, Bayesian linear regression, neural network regression, decision forest regression, boosted decision tree regression, artificial neural networks (ANN), Bayesian statistics, case-based reasoning, Gaussian process regression, inductive logic programming, learning automata, learning vector quantization, informal fuzzy networks, conditional random fields, genetic algorithms (GA), Information Theory, support vector machine (SVM), Averaged One-Dependence Estimators (AODE), Group method of data handling (GMDH), instance-based learning, lazy learning, Maximum Information Spanning Trees (MIST), and transfer learning methods based on pre-trained, generalized embeddings as well as domain-based embeddings.

The CTD modules 160 can be used in the machine learning process to train the classification algorithms included in the NLU of the NLA ensembles 145. The model trainer can evaluate the machine learning algorithm's prediction performance based on patterns in the received subset of features processed as training inputs and generates one or more new training models. The generated training models, e.g., classification algorithms and models included in the NLU of the NLA ensemble 145, are then capable of receiving user data including text strings corresponding to a user query via and to output predicted textual responses including at least one word from a lexicon associated with the tenant or entity for which the conversational agent system 100 has been configured and deployed.

Figure 2:
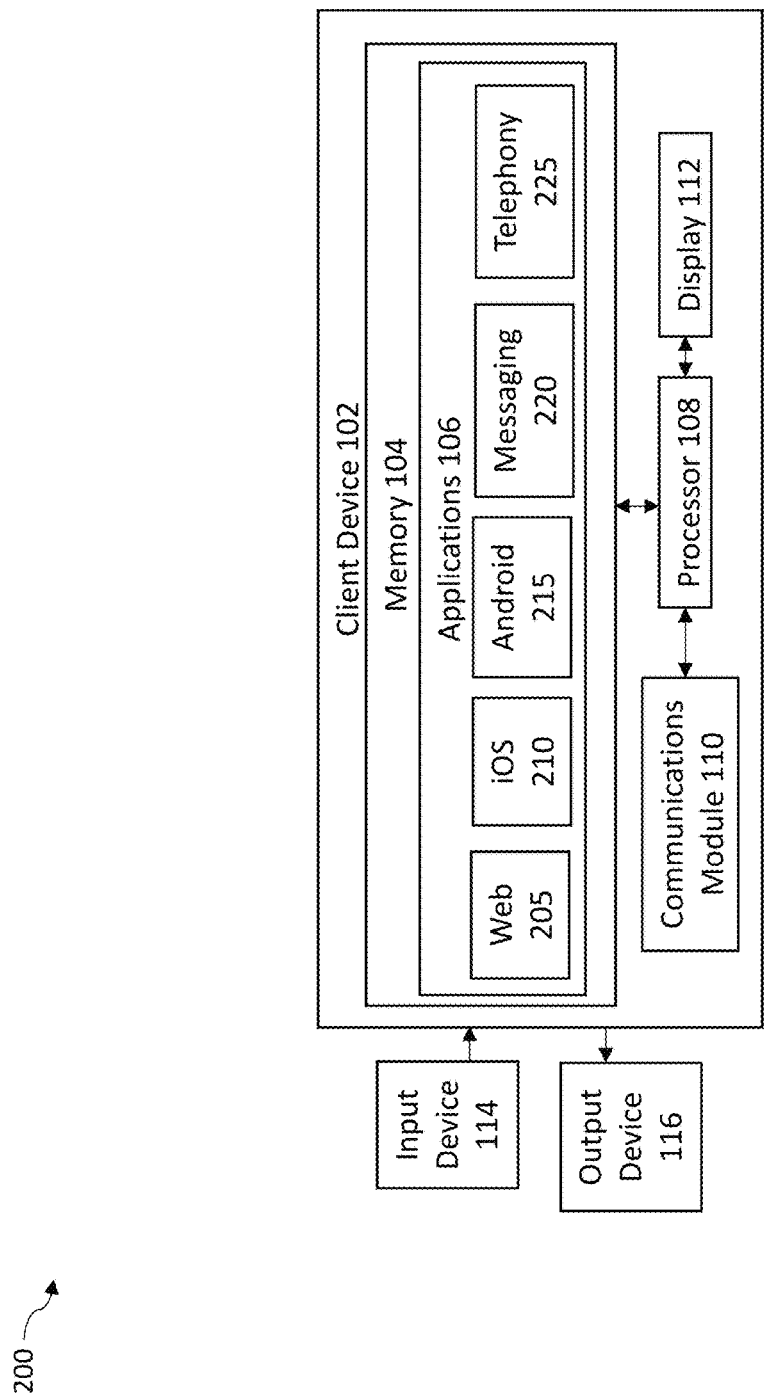
FIG. 2 illustrates an example architecture of a client device configured as a multi-modal conversational agent of the system described in FIG. 1.

FIG. 2 illustrates an example architecture of a client device 102 configured as a multi-modal conversational agent of the conversational agent system 100 described in relation to FIG. 1. As shown in FIG. 2, the client device 102 can include a plurality of applications 106. The applications 106 can include easily installed, pre-packaged software developer kits for which implement conversational agent frontend functionality on a client device 102. The applications 106 can include APIs as JavaScript libraries received from the dialog processing platform 120 and incorporated into a website of the entity or tenant to enable support for text and/or voice modalities via a customizable user interfaces. The applications 106 can implement client APIs on different client devices 102 and web browsers in order to provide responsive multi-modal interactive graphical user interfaces (GUI) that are customized for the entity or tenant. The GUI and applications 106 can be provided based on a profile associated with the tenant or entity. In this way, the conversational agent system 100 can provide customizable branded assets defining the look and feel of a user interface, different voices utilized by the TTS synthesis engines 140, as well as textual responses generated by the NLA ensembles 145 which are specific to the tenant or entity.

The web application 205 includes functionality configured to enable a web browser on a client device 102 to communicate with the dialog processing platform 120. The web application 205 can include a media capture API, a web audio API, a document object model, and a web socket API. The web application 205 can be configured to capture dynamic content generated by the multi-modal conversation agent configured on the client device 102. For example, the dynamic content can include clickable and multimodal interactive components and data. The iOS application 210 includes functionality configured to provide support for multi-modal conversational agents implemented on client devices 102 configured with the proprietary iOS operating system developed by Apple Inc. of Cupertino, Calif., U.S.A. In some implementations, the interface representation and interactive user model used for a conversational agent configured on a client device web browser can be converted and provided using the same interface representation deployed on a mobile device web browser. The android application 215 includes functionality configured to provide support for multi-modal conversational agents implemented on client devices 102 configured with the Unix-based Android operating system developed by the Open Handset Alliance of Mountain View, Calif., U.S.A. The messaging application 220 includes functionality configured to provide messaging support for a variety of chat and messaging platforms. In some implementations, the messaging application 220 can reproduce the same interface representation multi-modal experience as enabled on other client device 102 interfaces. The telephony application 225 includes functionality configured to provide telephony support via public switched telephone network (PSTN) devices and voice over internet protocol (VoIP) devices. In some implementations, the telephony application 225 can be configured to generate short conversational prompts or dialog sequences without reference to the content of the screen. Accordingly, the conversational agent system described herein can enable support for smart speaker client devices 102 and the conversational agents configured on the client devices 102 can automatically adapt to the capabilities of different devices.

Figure 3:
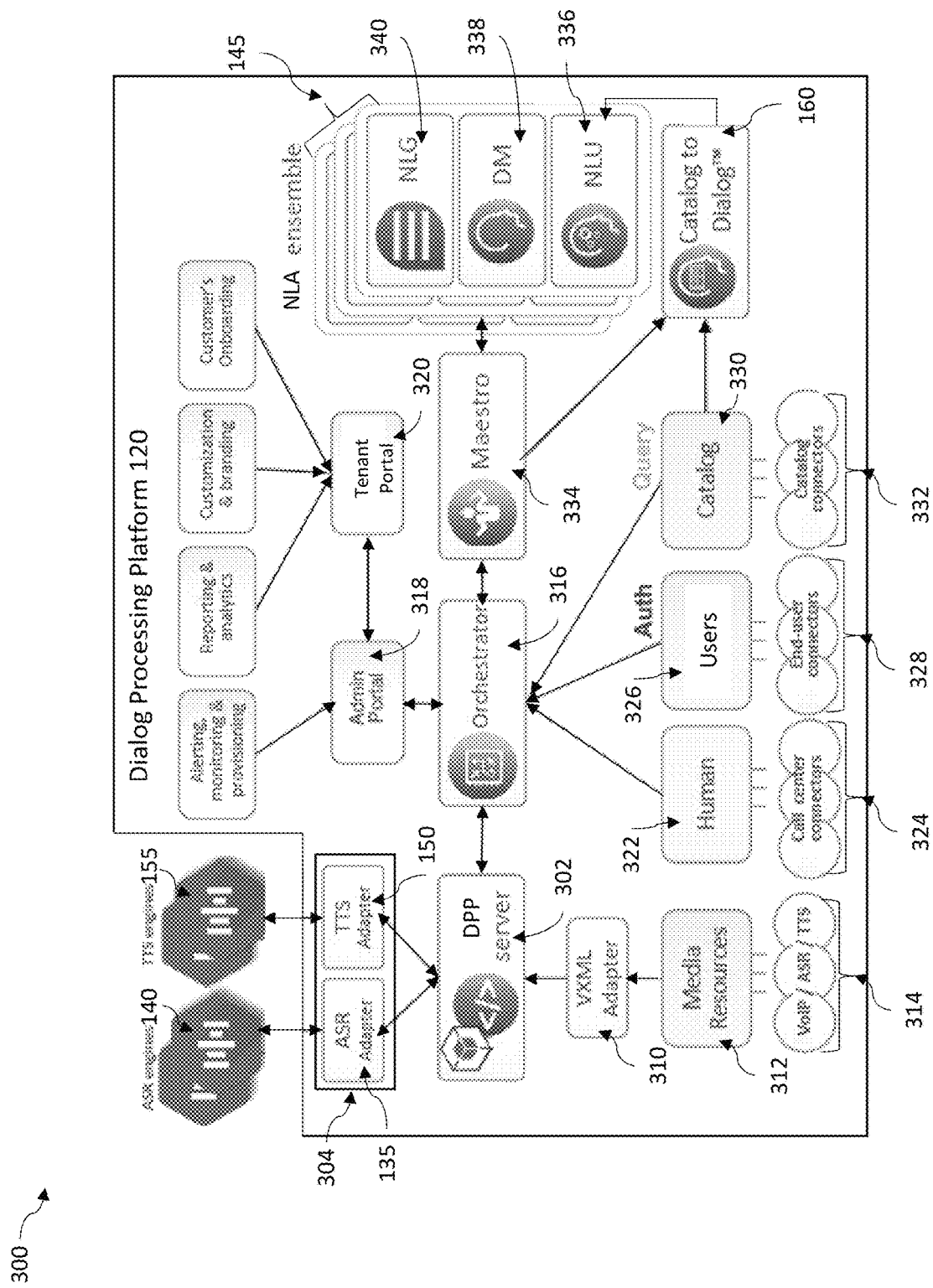
FIG. 3 illustrates an example architecture of a dialog processing platform of the system described in FIG. 1.

FIG. 3 illustrates an example architecture 300 of a dialog processing platform 120 of the system 100 described in relation to FIG. 1. The dialog processing platform 120 can serve as a backend of the conversational agent system 100. One or more components included in the dialog processing platform 120 shown in FIG. 3 can be configured on a single server device or on multiple server devices. One or more of the components of the dialog processing platform 120 can also be configured as a microservice, for example in a cloud computing environment. In this way, the conversational agent system 100 can be configured as a robustly scalable architecture that can be provisioned based on resource allocation demands.

The dialog processing platform 120 includes run-time components that are responsible for processing incoming speech or text inputs, determining the meaning in the context of a dialog and a tenant lexicon, and generate replies to the user which are provided as speech and/or text. Additionally, the dialog processing platform 120 provides a multi-tenant portal where both administrators and tenants can customize, manage, and monitor platform resources, and can generate run-time reports and analytic data. The dialog processing platform 120 interfaces with a number of real-time resources such as ASR engines 140, TTS synthesis engines 155, and telephony platforms. The dialog processing platform 120 also provides consistent authentication and access APIs to commercial e-commerce platforms.

As shown in FIG. 3, the dialog processing platform 120 includes a DPP server 302. The DPP server 302 can act as a frontend to the dialog processing platform 120 and can appropriately route data received from or to be transmitted to client devices 102 as appropriate. The DPP server 302 routes requests or data to specific components of the dialog processing platform 120 based on registered tenant and application identifiers which can be included in a profile associated with a particular tenant. The DPP server 302 can also securely stream to the ASR engines 140 and from the TTS synthesis engines 140.

For example, as shown in FIG. 3, the dialog processing platform 120 includes a plurality of adapters 304 configured interface the ASR engines 140 and the TTS synthesis engines 155 to the DPP server 302. The adapters 304 allow the dialog processing platform 120 to interface with a variety of speech processing engines, such as ASR engines 140 and TTS synthesis engines 155. In some implementations, the speech processing engines can be configured in a cloud-based architecture of the dialog processing platform 120 and may not be collocated in the same server device as the DPP server 302 or other components of the dialog processing platform 120.

The adapters 304 include a ASR engine adapter 135 and a TTS synthesis engine adapter 150. The ASR engine adapter 135 and a TTS synthesis engine adapter 150 enable tenants to dynamically select speech recognition and text-to-speech synthesis providers or natural language speech processing resources that best suit the users objective, task, dialog, or query.

As shown in FIG. 3, the dialog processing platform 120 includes a voiceXML (VXML) adapter 310 which can couple the DPP server 302 to various media resources 312. For example, the media resources 312 can include VoIP networks, ASR engines, and TTS synthesis engines 314. In some implementations, the media resources 312 enable the conversational agents to leverage existing telephony platforms, which can often be integrated with particular speech processing resources. The existing telephony platforms can provide interfaces for communications with VoIP infrastructures using session initiation protocol (SIP). In these configurations, VXML documents are exchanged during a voice call.

The dialog processing platform 120 also includes an orchestrator component 316. The orchestrator 316 provides an interface for administrators and tenants to access and configure the conversational agent system 100. The administrator portal 318 can enable monitoring and resource provisioning, as well as providing rule-based alert and notification generation. The tenant portal 320 can allow customers or tenants of the conversational agent system 100 to configure reporting and analytic data, such as account management, customized reports and graphical data analysis, trend aggregation and analysis, as well as drill-down data associated dialog utterances. The tenant portal 320 can also allow tenants to configure branding themes and implement a common look and feel for the tenants conversational agent user interfaces. The tenant portal 320 can also provide an interface for onboarding or bootstrapping customer data. In some implementations, the tenant portal 320 can provide tenants with access to customizable conversational agent features such as user prompts, dialog content, colors, themes, usability or design attributes, icons, and default modalities, e.g., using voice or text as a first modality in a dialog. The tenant portal 320 can, in some implementations, provide tenants with customizable content via different ASR engines 140 and different TTS synthesis engines 155 which can be utilized to provide speech data in different voices and/or dialects. In some implementations, the tenant portal 320 can provide access to analytics reports and extract, transform, load (ETL) data feeds.

The orchestrator 316 can provide secure access to one or more backends of a tenants data infrastructure. The orchestrator 316 can provide one or more common APIs to various tenant data sources which can be associated with retail catalog data, user accounts, order status, order history, and the like. The common APIs can enable developers to reuse APIs from various client side implementations.

The orchestrator 316 can further provide an interface 322 to human resources, such as human customer support operators who may be located at one or more call centers. The dialog processing platform 120 can include a variety of call center connectors 324 configured to interface with data systems at one or more call centers.

The orchestrator 316 can provide an interface 326 configured to retrieve authentication information and propagate user authentication and/or credential information to one or more components of the system 300 to enable access to a user's account. For example, the authentication information can identify one or more users, such as individuals who have accessed a tenant web site as a customer or who have interacted with the conversational agent system 100 previously. The interface 326 can provide an authentication mechanism for tenants seeking to authenticate users of the conversational agent system 100. The dialog processing platform 120 can include a variety of end-user connectors 328 configured to interface the dialog processing platform 120 to one or more databases or data sources identifying end-users. The interface 326 can also enable access to the tenant's customer order and billing data via one or more catalog or e-commerce connectors 328.

The orchestrator 316 can also provide an interface 330 to tenant catalog and e-commerce data sources. The interface 330 can enable access to the tenant's catalog data which can be accessed via one or more catalog or e-commerce connectors 332. The interface 330 enables access to tenant catalogs and/or catalog data and further enables the catalog data to be made available to the CTD modules 160. In this way, data from one or more sources of catalog data can be ingested into the CTD modules 160 to populate the modules with product or item names, descriptions, brands, images, colors, swatches, as well as structured and free-form item or product attributes.

The dialog processing platform 120 also includes a maestro component 334. The maestro 334 enables administrators of the conversational agent system 100 to manage, deploy, and monitor conversational agent applications 106 independently. The maestro 334 provides infrastructure services to dynamically scale the number of instances of natural language resources, such as tenant subsystems 130, ASR engines 140, TTS synthesis engines 155, NLA ensembles 145, and CTD modules 160. The maestro 334 can dynamically scale these resources as dialog traffic increases. The maestro 334 can deploy new resources without interrupting the processing being performed by existing resources. The maestro 334 can also manage updates to the CTD modules 160 with respect to updates to the tenants e-commerce data and/or product catalogs. In this way, the maestro 334 provided the benefit of enabling the dialog processing platform 120 to operate as a highly scalable infrastructure for deploying artificially intelligent multi-modal conversational agent applications 106 for multiple tenants or multiple tenant subsystems 130. As a result, the conversational agent system 100 can reduce the time, effort, and resources required to develop, test, and deploy conversational agents.

The dialog processing platform 120 further includes a CTD module 160. The CTD module 160 can implement methods to collect e-commerce data from tenant catalogs, product reviews, user account and order data, and user clickstream data collected at the tenants web site to generate a data structure that can be used to learn specific domain knowledge and to onboard or bootstrap a newly configured conversational agent system 100. The CTD module 160 can extract taxonomy labels associated with hierarchical relationships between categories of products and can associate the taxonomy labels with the products in the tenant catalog. The CTD module 160 can also extract structured product attributes (e.g., categories, colors, sizes, prices) and unstructured product attributes (e.g., fit details, product care instructions) and the corresponding values of those attributes. The CTD module 160 can normalize attribute vales so that the attribute values share the same format throughout the catalog data structure. In this way, noisy values caused by poorly formatted content can be removed.

Products in an e-commerce catalogs can be typically organized in a multi-level taxonomy, which can group the products into specific categories. The categories can be broader at higher levels (e.g., there are more products) and narrower (e.g., there are less products) at lower levels of the product taxonomy. For example, a product taxonomy associated with clothing can be represented as Clothing>Sweaters>Cardigans & Jackets. The category "Clothing" is quite general, while "Cardigans & Jackets" are a very specific type of clothing. A user's queries can refer to a category (e.g., dresses, pants, skirts, etc.) identified by a taxonomy label or to a specific product item (e.g., item #30018, Boyfriend Cardigan, etc.). In a web-based search session, a product search could either start from a generic category and narrow down to a specific product or vice versa. CTD module 160 can extract category labels from the catalog taxonomy, product attributes types and values, as well as product titles and descriptions.

The CTD module 160 can automatically generate attribute type synonyms and lexical variations for each attribute type from search query logs, product descriptions and product reviews and can automatically extract referring expressions from the tenant product catalog or the user clickstream data. The CTD module 160 can also automatically generate dialogs based on the tenant catalog and the lexicon of natural language units or words that are associated with the tenant and included in the data structure.

The CTD module 160 utilizes the extracted data to train classification algorithms to automatically categorize catalog categories and product attributes when provided in a natural language query by a user. The extracted data can also be used to train a full search engine based on the extracted catalog information. The full search engine can thus include indexes for each product category and attribute. The extracted data can also be used to automatically define a dialog frame structure that will be used by a dialog manger module, described later, to maintain a contextual state of the dialog with the user.

As shown in FIG. 3, the maestro 334 can interface with a plurality of natural language agent (NLA) ensembles 145. Each of the NLA ensembles 145 can include one or more of a natural language generator (NLG) module 336, a dialog manager (DM) module 338, and a natural language understanding (NLU) module 340. In some implementations, the NLA ensembles 145 can include pre-built automations, which when executed at run-time, implement dialog policies for a particular dialog context. For example, the pre-built automations can include dialog policies associated with searching, frequently-asked-questions (FAQ), customer care or support, order tracking, and small talk or commonly occurring dialog sequences which may or may not be contextually relevant to the user's query. The NLA ensembles 145 can include reusable dialog policies, dialog state tracking mechanisms, domain and schema definitions. Customized NLA ensembles 145 can be added to the plurality of NLA ensembles 145 in a compositional manner as well.

Each NLA ensemble 145 can include at least one of a natural language understanding (NLU) module 336, a dialog manager (DM) module 338, and a natural language generator (NLG) module 340. The operation of the NLA ensemble 140 and its modules will be described further in the relation to FIGS. 5-7.

As shown in FIG. 3, the NLA ensemble 145 includes a natural language understanding (NLU) module 336. The NLU module 336 can implement a variety of classification algorithms used to classify input text associated with a user utterance and generated by the ASR engines 140 into a semantic interpretation. In some implementations, the NLU 336 can classify input text when the utterance incudes customer support requests/questions about products and services, as well as user queries. In some implementations, the NLU module 336 can implement a stochastic intent classifier and a named-entity recognizer ensemble to perform intent classification and information extraction, such as extraction of entity or user data. The NLU module 336 can combine different classification algorithms and can select the classification algorithm most likely to provide the best semantic interpretation for a particular task or user query by determining dialog context and integrating dialog histories.

The classification algorithms included in the NLU module 336 can be trained in a supervised machine learning process using support vector machines or using conditional random field modeling methods. In some implementations, the classification algorithms included in the NLU module 336 can be trained using a convolutional neural network, a long short-term memory recurrent neural network, as well as a bidirectional long short-term memory recurrent neural network. The NLU module 336 can receive the user query and can determine surface features and feature engineering, distributional semantic attributes, and joint optimizations of intent classifications and entity determinations, as well as rule based domain knowledge in order to generate a semantic interpretation of the user query. In some implementations, the NLU module 336 can include one or more of intent classifiers (IC), named entity recognition (NER), and a model-selection component that can evaluate performance of various IC and NER components in order to select the configuration most likely generate contextually accurate conversational results. The NLU module 336 can include competing models which can predict the same labels but using different algorithms and domain models where each model produces different labels (customer care inquires, search queries, FAQ, etc.).

The NLA ensemble 145 also includes a dialog manager (DM) module 338. The DM module 338 can select a next action to take in a dialog with a user. The DM module 338 can provided automated learning from user dialog and interaction data. The DM module 338 can implement rules, frames, and stochastic-based policy optimization with dialog state tracking. The DM module 338 can maintain an understanding of dialog context with the user and can generate more natural interactions in a dialog by providing full context interpretation of a particular dialog with anaphora resolution and semantic slot dependencies. In new dialog scenarios, the DM module 338 can mitigate "cold-start" issues by implementing rule-based dialog management in combination with user simulation and reinforcement learning. In some implementations, sub-dialog and/or conversation automations can be reused in different domains.

The DM module 338 can receive semantic interpretations generated by the NLU module 336 and can generate a dialog response action using context interpreter, a dialog state tracker, a database of dialog history, and an ensemble of dialog action policies. The ensemble of dialog action policies can be refined and optimized using rules, frames and one or more machine learning techniques.

As further shown in FIG. 3, the NLA ensemble 145 includes a natural language generator (NLG) module 340. The NLG module 340 can generate a textual response based on the response action generated by the DM module 338. For example, the NLG module 340 can convert response actions into natural language and multi-modal responses that can be uttered or spoken to the user and/or can be provided as textual outputs for display to the user. The NLG module 340 can include a customizable template programming language which can be integrated with a dialog state at runtime.

In some implementations, the NLG module 340 can be configured with a flexible template interpreter with dialog content access. For example, the flexible template interpreter can be implemented using Jinja2, a web template engine. The NLG module 340 can receive a response action the DM module 338 and can process the response action with dialog state information and using the template interpreter to generate output formats in speech synthesis markup language (SSML), VXML, as well as one or more media widgets. The NLG module 340 can further receive dialog prompt templates and multi-modal directives. In some implementations, the NLG module 340 can maintain or receive access to the current dialog state, a dialog history, and can refer to variables or language elements previously referred to in a dialog. For example, a user may have previously provided the utterance "I am looking for a pair of shoes for my wife". The NLG module 340 can label a portion of the dialog as PERSON TYPE and can associate a normalized GENDER slot value as FEMALE. The NLG module 340 can inspect the gender reference and customize the output by using the proper gender pronouns such as 'her, she, etc.'

Figure 4:
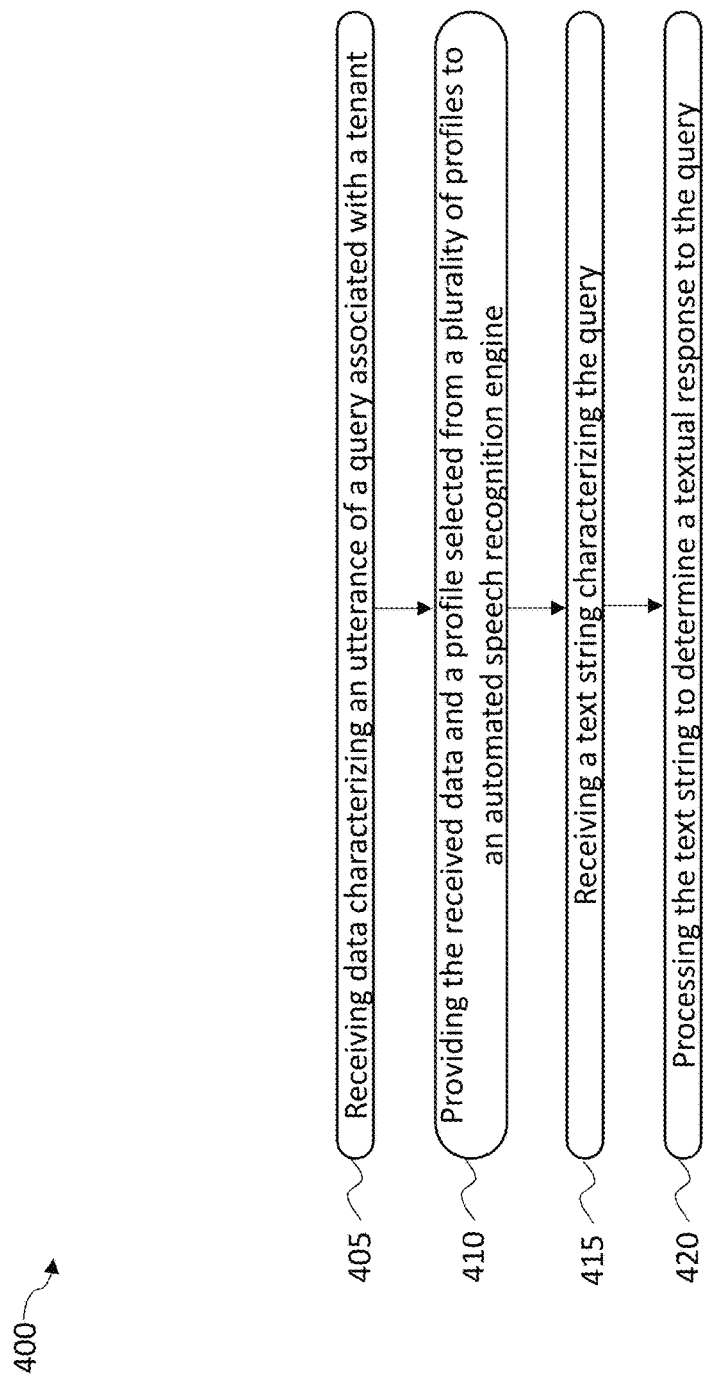
FIG. 4 is a flowchart illustrating an example method for determining a textual response to an utterance of a query provided by a user via a client device of the system described in FIG. 1.

FIG. 4 is a flowchart illustrating an example method for determining a textual response to an utterance of user query processed by the dialog processing platform 120 described in relation to FIGS. 1 and 3.

In operation 405, data characterizing an utterance of a query associated with a tenant can be received. In some implementations, data characterizing the utterance can include audio data received by an input device 114 of client device 102 and provided to/received by the dialog processing platform 120. In some implementations, the data characterizing the utterance can be provided via text, for example a user can provide the utterance as textual input to a conversational agent configured in a web site of an ecommerce entity or tenant. The user can provided the utterance in regard to a goal or objective that the user seeks to accomplish in cooperation with the tenant. The user can provide the data characterizing the utterance of the query in a dialog with a conversational agent configured as an application 106 on the client device 102.

At operation 410, the received data can be provided to an automated speech recognition engine, such as ASR engine 140, along with a profile selected from a plurality of profiles associated with the tenant. The profile can configure the ASR engine 140 to process the received data by specifying suitable configurations that are associated with the tenant and identified in tenant profile. The configurations can include the tenant specific lexicon. The tenant specific lexicon can include domain language and channel audio characteristics associated with the tenant. For example, the tenant specific lexicon can include product and/or service names, alternative phonetic annunciations and pronunciations, and audio channel information such as telephony or digital voice quality and/or audio coding types. For some ASR engines 140 a language model for each state of a dialog can be identified. A language model can include a set of statically related or defined sentences. The language model can be identified when specific contextual conditions exist in a dialog, such as when the conversational agent expects to receive a business name. In such circumstances, a business name language model can be identified and activated.

The ASR engine 140 can receive the data and process the audio data or textual data to determine a string of text corresponding to the data received at the client device 102. For example, the ASR engine 140 can receive the user's verbal utterance forming a query "When will my order be delivered?". The ASR engine 140 can process the audio data including the verbal utterance to decompose the received data into a string of natural language units or words. The ASR 140 can select words to be included in the text string based on the profile associated with the tenant. In this way, the ASR engine 140 operates or is selected to operate in a manner that is most likely to generate a text string that is contextually most relevant to the tenant and best represents the intention of the user conveyed via the utterance. The profile can be defined and generated via the tenant portal 320 and can be distributed or made accessible to other components of the system 300 via the orchestrator 316. In some implementations, the profile can be stored in the DPP server 302 and can be propagated to the maestro 334. For example, a tenant may prefer a TTS synthesis engine 155 configured with a male voice and customized to process specific product names which are not commonly recognized by an ASR engine 140. At run time, the DPP server 302 can provide a TTS voice identifier to the TTS synthesis engine 155 each time speech is to be generated. At the same time, the DPP server 302 can provide a list of specific product names which are not commonly recognized to the ASR engine 140 every time the system 300 is listening to the user. In some implementations, the maestro 334 can add more configurations of the TTS synthesis engines 155 based on the dialog context. And by configuring the ASR engine 140 with a profile selected based on the tenant, specific ASR engine 140 technology can be easily changed, updated, and/or reconfigured on a tenant-specific basis.

In operation 415, the NLA ensemble 145 can receive the text string characterizing the query. In some implementations, the query can include the utterance or portions of the utterance. In some implementations, the query can include a text request. The text string output by the ASR engine 140 can be conveyed to the NLA ensemble 145 for processing.

In operation 420, the NLA ensemble 145 can process the text string to determine a textual response to the query. The text string can be first processed by the NLU module 336 to generate a semantic interpretation associated with the text string. The semantic interpretation can next be processed by the DM module 338 to determine a contextual sequence associated with the text string and a response action to the query (and the corresponding text string). The response action can then be processed by the NLG module 340 to determine a textual response corresponding to the response action. In the example use case of FIG. 1, the NLA ensemble 145 have determined the most contextually relevant response action to the user's query regarding the status of their order is "Your order will be delivered tomorrow." Additional detail associated with processing the text string will be provided in the description of FIG. 6.

Figure 5:
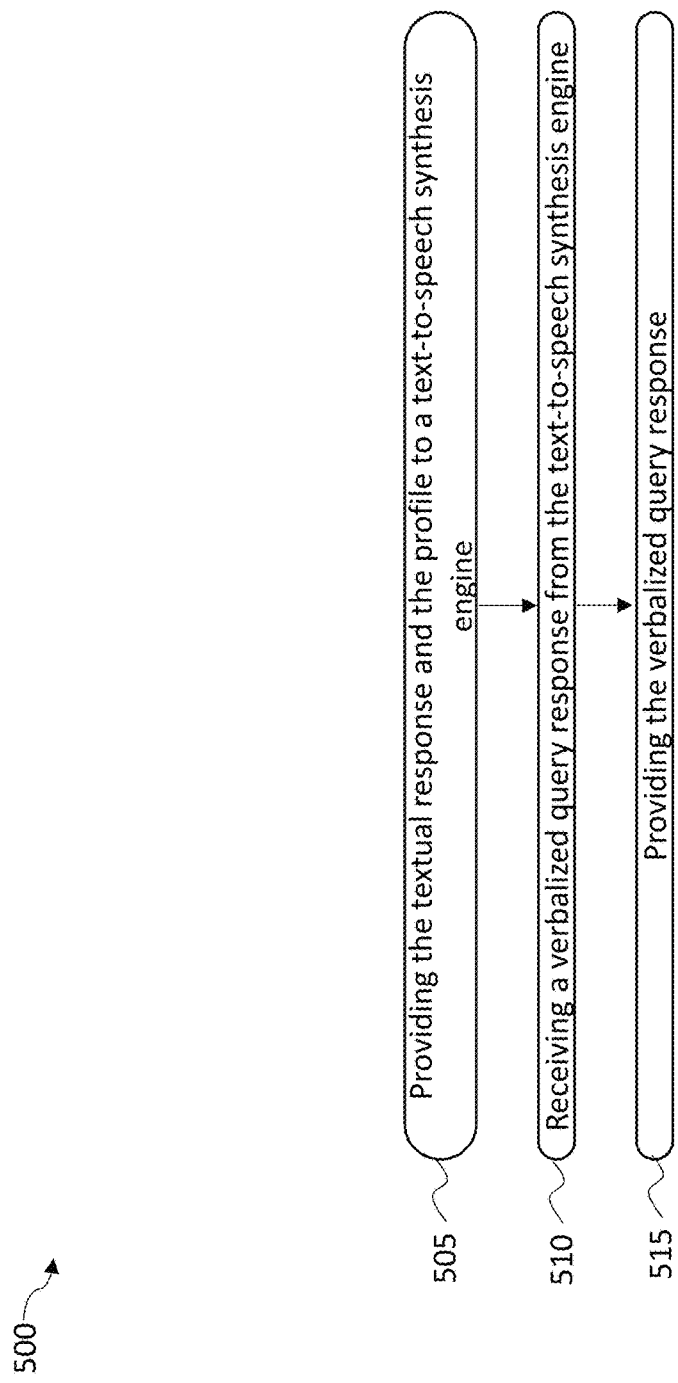
FIG. 5 is a flowchart illustrating an example method for providing a verbalized query response to a user via a client device of the system described in FIG. 1.

FIG. 5 is a flowchart illustrating an example method for providing a verbalized query response to a user via the client device 102 and the dialog processing platform 120 described in relation to FIGS. 1 and 3. In operation 505, the textual response generated by the NLA ensemble 145 can be provided to the TTS synthesis engine 155 with the tenant profile. The tenant profile can be used to configure and select a TTS synthesis engine 155 associated with the tenant and such that the TTS synthesis engine 155 can generate a verbalized query response, which includes a plurality of natural language units or words selected from a lexicon associated with the tenant or the tenant's applications 106. In the example use case of FIG. 1, the NLA ensemble 145 have determined the most contextually relevant response action to the user's query inquiring about the status of their order is "Your order will be delivered tomorrow." The textual response action generated by the NLA ensemble 145 can be received by the TTS synthesis engine 155. The TTS synthesis engine 155 can determine a verbalized response query, using the tenant profile.

In operation 510, the DPP server 302 can receive a verbalized query response from the TTS engine 155 and in operation 515, the DPP server 302 can provide the verbalized query response to the client device 102. The client device 102 can further provide the verbalized query response to the user via the output device 116, such as a speaker. In some implementations, the user can select between a textual modality and a voice or speech modality. For example, the applications 106 can include a user-settable mechanism to configure the conversational agent for textual dialogs or voice dialogs. In implementations when the text mode is selected, the DPP server 302 can exclude the ASR engines 140 and the TTS synthesis engines 155 and can transmit the textual data to the orchestrator 316.

Figure 6:
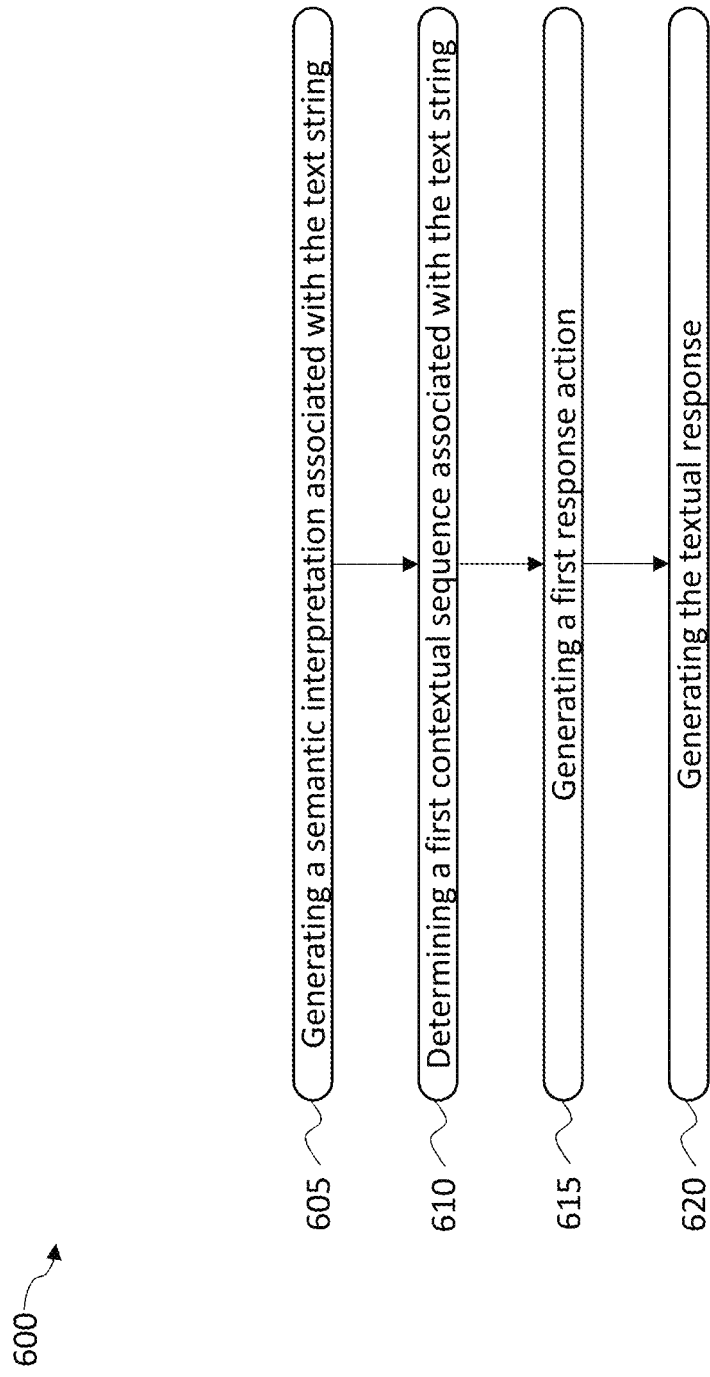
FIG. 6 is a flowchart illustrating an example method for processing a text string characterizing a query.

FIG. 6 is a flowchart illustrating an example method for processing a text string characterizing a query. The text string, associated characterizing the user's query and generated by the ASR engine 140, can be provided to the NLA ensemble 145 for processing to generate a textual response. The text string is initially provided to the NLU module 336.

In operation 605, a semantic representation associated with the text string can be generated by the NLU module 336. The semantic representation can include an attributes of the query such as the query intent, an intent type, and a category of the intent. The NLU module 336 can provide the location of the information extracted from the query. For example, the NLU module 336 can provide an index span indicating the position of an word in the query. In some implementations, the NLU module 336 can determine and provide confidence scores estimating the accuracy of the predictions as well as normalized values based on gazetteers and/or a backend database. For example, the NLU module 336 can normalize "trousers" to a taxonomic category "pants and shorts" based on the tenant's catalog data.

In operation 610, the DM module 338 determines a first contextual sequence associated with the text string. For example, the DM module 338 can receive the semantic representation generated by the NLU module 336 and can interpret the context of the semantic representation to determine a state of the dialog which the user's query is included. The DM module 338 can include a dialog state tracker and a dialog history component to determine the context of the semantic representation associated with the user's query.

In operation 615, the DM module 338 can generate a response action based on the determined contextual sequence. The DM module 338 can further include an ensemble policy which can receive input from the dialog state tracker to generate the response action. The DM module 338 can generate the response action via one or more policy optimization models, rules, and/or frames. The DM module 338 can generate an optimal response to the user by combining a number of strategies. For example, the DM module 338 can utilized a frame-based policy. The frame-based policy can determine intents and can associate slots to complete the task initiated by the user. Slots can include bits of information required to provide an answer to the user. If a user query is associated with purchasing shoes, it can be necessary to understand the type of shoes, the size of the shoe, and the width of the shoe, which can be a required parameter used to determine a suitable shoe fitting model. Mandatory and optional slots, as well as slots that are dependent on the value of other slots can be used to determine the next action of the dialog. The DM module 338 can determine which mandatory or optional slot may be necessary next in the dialog sequence based on which slot may shorten the time to reach the goals. For example, the DM module 338 can be configured to ask for a shoe style since information received in regard to the shoe style can narrow down the potential choices more than dialog regarding the users shoe size. The DM module 338 can include one or more dialog policies. The dialog policies can be learned from data. For example, data associated with the sequences of dialog turns between the conversational agent/system 300 and the user can be converted into a vector representation and used to train a sequence model to predict the next optimal dialog action.

In operation 620, the NLG module 340 can receive the response action generated by the DM module 338 and can generate a textual response. The NLG module 340 can include a copy of the dialog state from the dialog tracker configured in the DM module 338 and can process the action using a template interpreter. In some implementations, the template interpreter can include a Jinja or Jinja2 template interpreter written in the Python programming language. The template interpreter can output a textual response which can be further formatted by one or more output formatting components using SSML, VXML, and/or various other media widgets. In some implementations, the NLG module 340 can generate HyperText Markup Language (HTML) or meta-representations for GUI elements and content including clickable buttons, text, and images.

Figure 7:
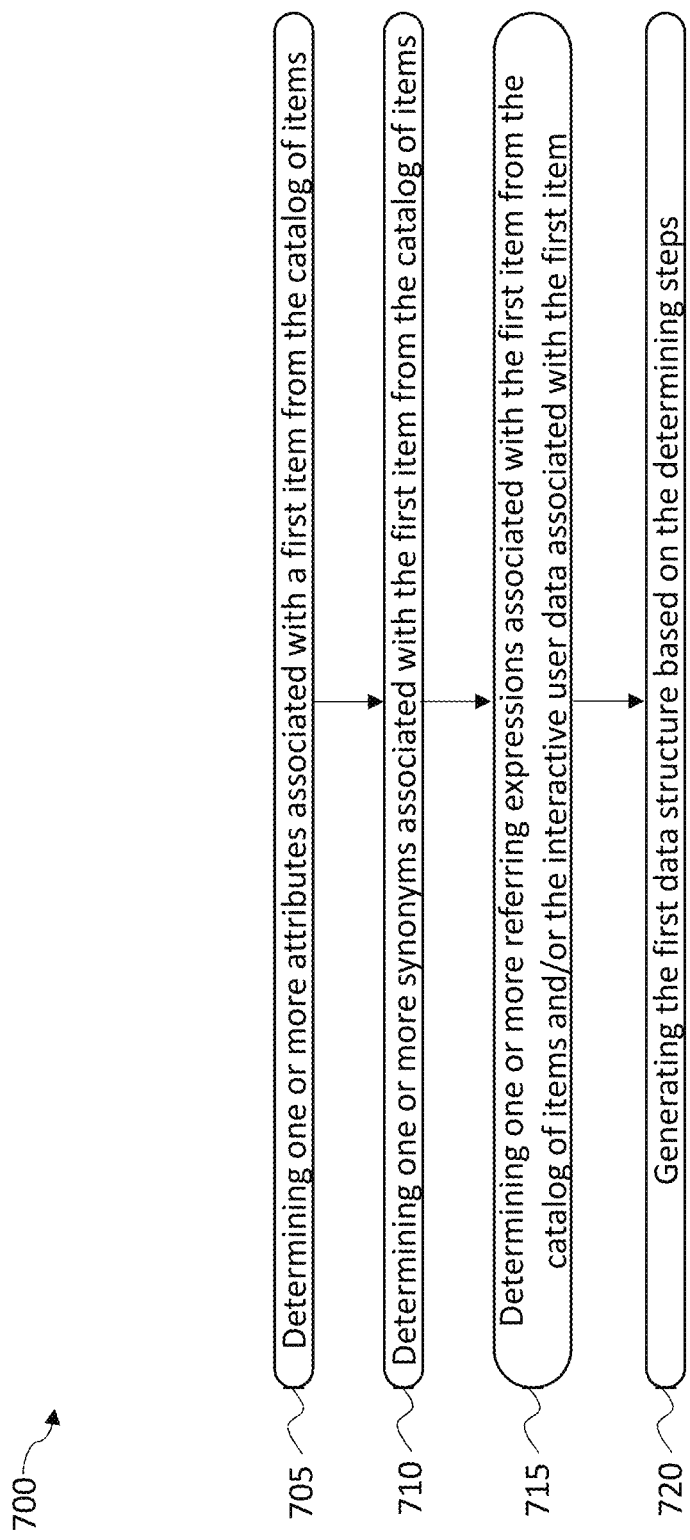
FIG. 7 is a flowchart illustrating an example method for generating a first data structure used in generating the semantic representation associated with the text string characterizing a query.

FIG. 7 is a flowchart illustrating an example method for generating a first data structure. The data structure can be used by the NLU module 336 to generate the semantic representation associated with the text string characterizing a query. The data structure can include product attributes, product synonyms, referring expressions related to the tenant's products, and common dialogs related to the tenant's products. The data structure can be generated by the CTD module 160.

For example, in operation 705, the CTD 160 module can determine one or more product attributes associated with an item from the tenants catalog of products or items. The CTD module 160 can determine and generate the product attributes by extracting synonyms in a specific product domain. The product attributes can be used by the NLU module 336 to expand slot values associated with a particular product. For example, the CTD module 160 and the data structure it generates can include the attributes of "moccasin, boots, heels, sandals" for a product identified as a "shoe". The CTD module 160 can be trained on product or tenant domain data but can also learn patterns and context in which the words are used, thus allowing the CTD module 160 to automatically infer words with the same meaning. The CTD module 160 can employ word embeddings, lexical databases, such as WordNet, and lexical chains to determine the product attributes.

In operation 710, the CTD module 160 can determine one or more synonyms associated with an item from the tenant product catalog. A product attribute can be a property or attribute of a product. A retailer category can be defined by a product taxonomy. For example, "sweaters" can be a category label associated with products in the clothing domain. The CTD module 160 can automatically determine that "pullovers", "cardigans", "turtleneck", "shaker", and "cardigan sweater" are all synonyms and are referring the same category. The CTD module 160 can automatically expand the lexicon for both catalog searching and search query interpretation. The CTD module 160 can use both word and sentence embeddings and can extract similar words from a specific domain and click stream data from search query logs. In some implementations, the CTD module 160 can use prebuilt embeddings or can train specific embeddings for the domain using catalog and review data. Additionally, CTD module 160 can include a classifier that can automatically classify unseen search terms into a taxonomy label.

In operation 715, the CTD module 160 can determine one or more referring expressions associated with an item from the tenant product catalog. Additionally, or alternatively, the CTD module 160 can determine one or more referring expressions based on interactive user data associated with the item. The CTD module 160 can automatically learn how customers refer to items in the tenants product catalog. For example, the CTD module 160 can process the tenant catalog and clickstream data received by users visiting the tenants website or online product catalog and can apply word embeddings and sequence-to-sequence models. Semantic similarities can be determined and the results can be ranked for inclusion in the data structure.

In operation 720, the CTD module 160 can generate the data structure based on operations 705-715. The data structure can then be used to update the classification algorithms included in the NLU module 336. At run-time, the orchestrator 316 can configure periodic, e.g., daily, updates to the CTD module 160 and the data structure. For example, billing, order, catalog, clickstream, and review data can be uploaded to the CTD module 160 and processed to extract product titles, descriptions, and attributes. The CTD module 160 can normalize attribute values, extract keywords and n-grams, tokenize the data, and define a search index for use in the data structure. The data structure can then be used in the NLU module 336 to update a search index, optimize ranking functions, and update the classification algorithms used to generate the semantic interpretation associated with the text string characterizing the user's query.

Figure 8:
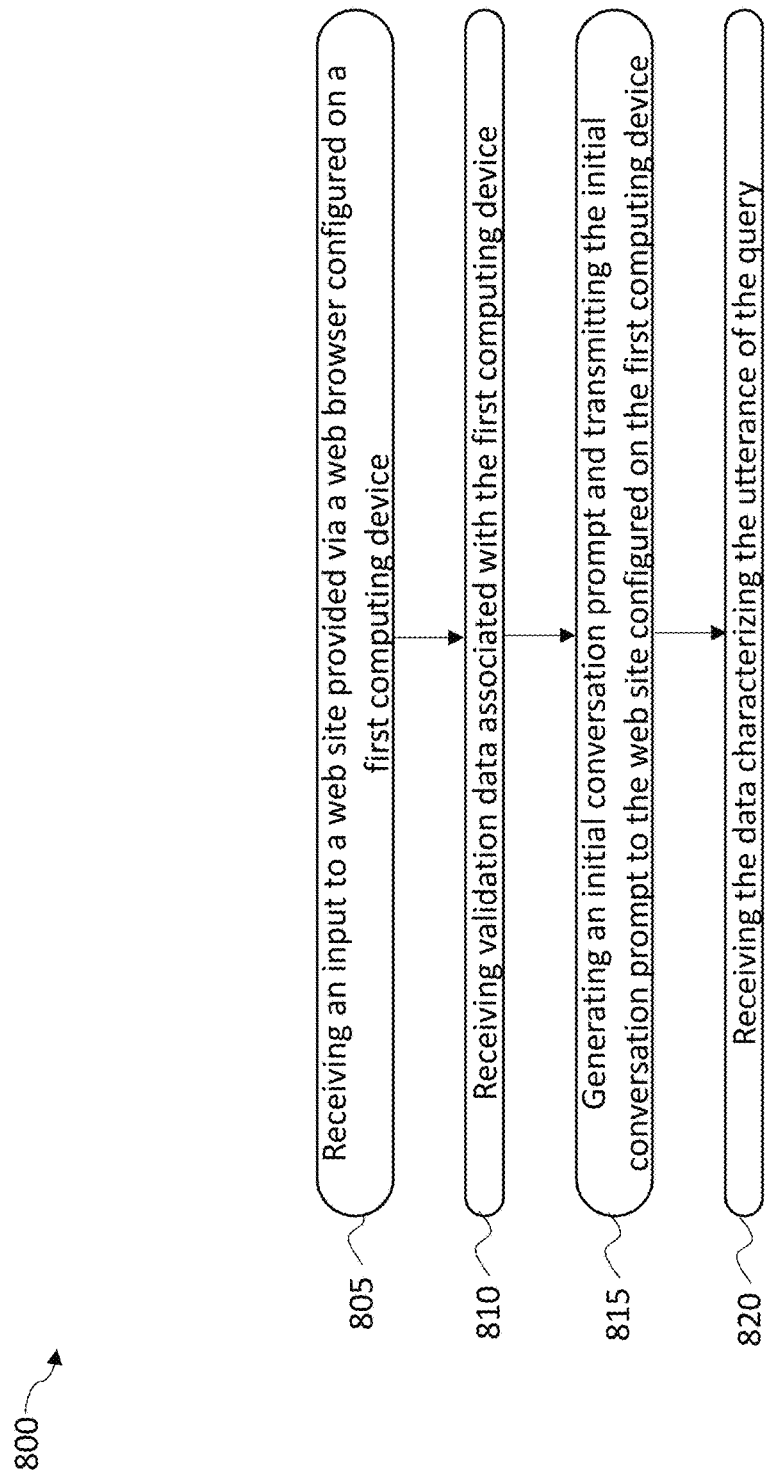
FIG. 8 is a flowchart illustrating an example method for generating an initial conversation prompt via a multi-modal conversational agent of the system described in FIG. 1.

FIG. 8 is a flowchart illustrating an example method for generating an initial conversation prompt via a multi-modal conversational agent of the system described in relation to FIG. 1. Prior to receiving data characterizing an utterance of a user query, the conversational agent system 100 can generate an initial conversation prompt and configure the conversational agent 106 on the client device 102 to communicate and conduct multi-modal dialog exchanges with the dialog processing platform 120. In the example described below, assume that a user is utilizing a smartphone device 102 and browsing an e-commerce website associated with a retail entity. The web site offers both text and speech interfaces to the dialog processing platform 120.

In operation 805, the web site receives an input provided via the web browser configured on the client device 102. The user can provide the input, for example, by clicking the "Speak" button in the web site.

In operation 810, the dialog processing platform 120 receives validation data associated with the client device 102. For example, based on receiving the input in operation 805, a network connection will be initiated, e.g., via web sockets, and the web browser configured with application 205, can be authenticated and registered through the DPP server 302. The DPP server 302 can receive validation data about the audio and graphical processing capabilities of the client device 102 and can validate if the client device 302 is able to render graphics and capture audio in real-time.

Upon receiving the validation data and validating the client device 102, the DPP server 302 can generate a conversation initiation message and provide the conversation initiation message to the maestro component 334. The maestro component 334 can provide an initial conversation response message back to the DPP server 302 which can initiate a call to the TTS synthesis engine 155 via the TTS adapter 150. The DPP server 302 will begin streaming audio data from the TTS adapter 150 to the application 205. In operation 815, the DPP server 302 will generate an initial conversation prompt by providing an audible prompt and textual output on the display 112 of the client device 102. The initial conversation prompt can inform the user that the system 100 is ready to receive a user query, for example, the initial conversation prompt can include "Hello. Welcome to ACME shoes. How may I help you?".

In operation 820, the client device 102 can receive data characterizing the utterance of a query associated with the tenant as described earlier in the discussion of FIG. 4, operation 405.

Figure 9:
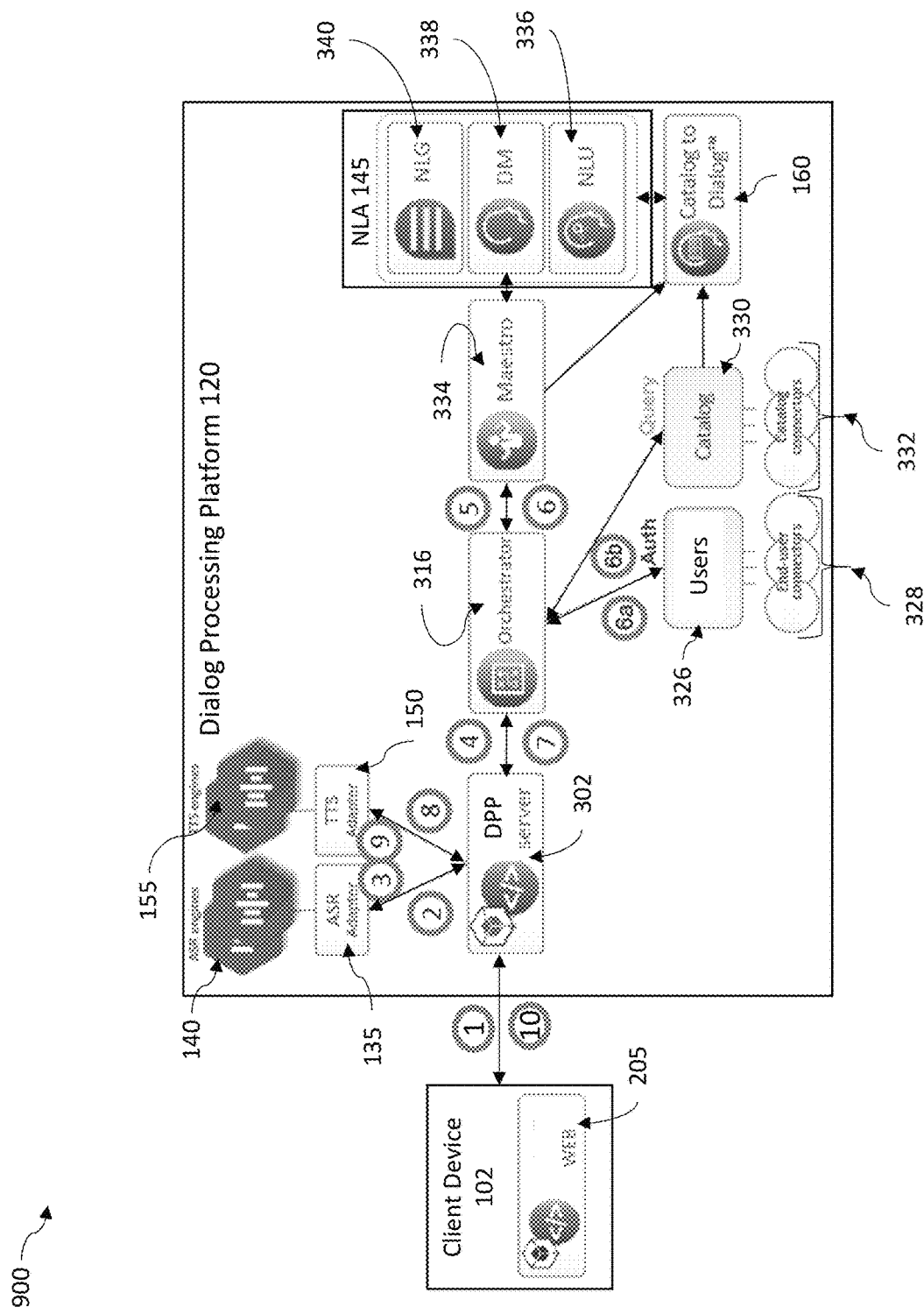
FIG. 9 is a diagram illustrating an example data flow for processing a dialog using a multi-modal conversational agent and the system of FIG. 1.

FIG. 9 is a diagram illustrating an example data flow 900 for receiving and processing a user query using the multi-modal conversational agent system 100 of FIG. 1. Following the configuration of the initial conversation prompt described in relation to FIG. 8, the conversational agent system 100 can receive data characterizing an utterance of a query. The data can be received in the context of a dialog and processed as follows.

In step 1, in response to the initial conversation prompt generated by the DPP server 302, the client device 102 can receive a user query, such as "I am looking for a pair of elegant shoes for my wife". The client device 102 can capture the utterance associated with the query via the microphone 114 configured on the client device 102. The captured audio data is streamed by web application 205 to the DPP server 302 in addition to a profile associated with the tenant.

In step 2, the DPP server 302 streams the received audio data to the ASR adapter 135. The ASR adapter 135 can provide the audio data to a ASR engine 140 associated with the tenant profile. In some implementations, the ASR engine 140 can be a pre-configured cloud-based ASR engine, such as the Google Cloud ASR offered by Google, LLC of Mountain View, Calif., U.S.A.

In step 3, the ASR engine 140 processes the audio data in real-time until the user completes the utterance associated with the query. After completing the utterance, the user is likely to pause and await a reply from the conversational agent system 100. The ASR engine 140 can detect the end of the utterance and the subsequent period of silence and can provide the DPP server 302 with the best hypothetical text string corresponding to the user's utterance. In a best-case scenario, the ASR engine 140 can generate a text string which exactly matches the words of the user's utterance. The text string can be combined with other parameters related to the processed utterance. In some implementations, the other parameters can include rankings associated with the recognized speech. The rankings can be dynamically adjusted based on the NLU module 336. For example, the NLU module 336 can process the top hypotheses generated by the ASR engine 140 and can evaluate those hypothetical responses in the context of other responses generated by the NLU module 336 so that the top hypothesis is selected over another hypothesis which can include a lower confidence ranking. In some implementations, the parameters can be associated with errors such as phonetically similar words. Small variations in text strings can be mitigated using similarity measures, such as the Levenshtein distance or fuzzy matching algorithm.

In step 4, the DPP server 302 can provide the text string to the orchestrator component 316 and await a reply. In step 5, the orchestrator component 316 can transmit the text string to the maestro component 334.

In step 6, the maestro component 334 can provide the text string to the NLA ensemble 145 for response processing. The NLA 145 can determine the current state of the dialog via the DM 338 and can generate a contextually appropriate textual response to the query. The NLA ensemble 145 can also, in some implementations, generate graphical content associated with query and the dialog context to be displayed on the display 112 of the client device 102. The textual response and the corresponding graphical content can be provided in a device-agnostic format. The NLA ensemble 145 can determine that the contextually appropriate textual response to the query is "I can help you with that. What size does she usually wear?"

In step 6a, the dialog processing platform 120 can perform an authentication of the user. The orchestrator component 316 can be granted access to the user's account in the event that the user's query requires information associated with a specific order or account. For example, if the user utters "When will my order arrive?", the maestro component 334 can interpret the utterance and query, via the orchestrator component 316 (as in step 6), and can prompt the user to provide account authentication credentials in order to determine the status of the order in step 6a. After access has been granted in step 6b, the orchestrator component 316 can cache the authentication token for the duration of the dialog session to avoid repeating the authentication steps for other queries.

In step 7, the orchestrator component 316 can format the textual response and graphical content into a suitable format for the configuration of the client device 102. For example, the orchestrator component 316 can apply tenant-defined brand customizations provided via the customer portal 320. The customizations can specify a color palette, font style, images and image formatting, and TTS synthesis engines 155 to use which may include one or more alternate voice dialects.

In step 8, based on the format of the textual response and the graphical content provided by the orchestrator component 316, the DPP server 302 can provide the textual response to the TTS adapter 150 to initiate speech synthesis processing by the TTS synthesis engines 155 to generate a verbalized query response. In some implementations, the TTS synthesis engines 155 can be remotely located from the DPP server 302, such as when configured in a cloud-based, distributed conversational agent system. The DPP server 302 can also provide, in step 10, the textual response graphically with the appropriate formatting on the display 112 of the client device 302.

In step 9, the TTS adapter 150 can begin retrieving audio data associated with the verbalized query response from the TTS synthesis engine 155 in response to a request from the DPP server 302. The TTS adapter 150 can subsequently provide, or stream, the verbalized query response to the DPP server 302.

In step 10, the DPP server 302 can act as a proxy by sending the verbalized query response to web application 205 on the client device 102. The web application 205 can provide the verbalized query response to the user via the output device 116 audibly informing the user "I can help you with that. What size show does she usually wear?".

Steps 1-10 can be performed in an iterative manner via the client device 102 and the dialog processing platform 120 until the user's query has been fulfilled or the user terminates the dialog session. The web application 205, configured as the conversational agent on the client device 102, can enable the user to switch from speech to text as input and output modes as well as switching from text to speech as input and output modes.

Exemplary technical effects of the methods, systems, and computer-readable medium described herein include, by way of non-limiting example, processing a user query using a multi-modal conversation agent system. The conversational agent system can provide scalable, modular natural language processing resources for multiple tenants for which the user query can be directed. The conversational agent system can provide improved interfaces for processing the user query using distributed natural language resources. The conversational agent system can improve the contextual accuracy of conversational agent dialogs using a catalog-to-dialog data structure incorporated into a machine learning process used to train classification algorithms configured to process the user query and generate query responses. The conversational agent system also provides improved interfaces for tenants to customize conversational agent branding and provide more accurate dialog responses based on integrated e-commerce data sources such as user account, billing, and customer order data.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
receiving, by a multitenant remote server providing infrastructure for deployment of executable instances of natural language resources and for use by multiple tenants, data characterizing an utterance of a query by a first user and associated with a first tenant, the first tenant including an entity different than the first user and providing at least one of services or products to users, the multitenant remote server capable of dynamically allocating executable instances of natural language resources among the multiple tenants and including a tenant portal configured to provide the first user associated with the first tenant customization of reporting, graphical analysis of analytic trend data, account management, branding themes, user interface designs, instantiations of customer data, and customized executable natural language agent ensembles;
deploying, responsive to the receiving and within the multitenant remote server, a first instance of an executable natural language resource including a first instance of an executable natural language agent ensemble associated with the data and the first tenant, the first instance of the executable natural language agent ensemble configured to receive a text string characterizing the query and determine a textual response to the query;
providing, to an automated speech recognition engine and using at least the multitenant remote server, the received data and a profile selected from a plurality of profiles based on the first tenant, the profile generated and distributed within the multitenant remote server via the tenant portal, wherein the profile automatically configures the automated speech recognition engine to process the received data using a first lexicon associated with the first tenant, the profile including a registered tenant identifier identifying the first tenant as an authorized user of the multitenant remote server and an application identifier identifying one or more applications to be configured on a first computing device at which the data characterizing the utterance of the query is initially received, wherein the plurality of profiles include a second profile associated with a second tenant;

receiving, from the automated speech recognition engine and by the multitenant remote server, a text string characterizing the query; and processing, via the first instance of the executable natural language agent ensemble, the text string characterizing the query to determine a textual response to the query, the textual response including at least one word from the first lexicon associated with the first tenant.

2. The method of claim 1, further comprising providing, to a text-to-speech synthesis engine, the textual response and the profile;

receiving, from the text-to-speech synthesis engine, a verbalized query response determined by the text-to-speech synthesis engine based on the textual response; and providing the verbalized query response.

3. The method of claim 2, wherein the text-to-speech synthesis engine is configured to receive the textual response, and to generate, in response to the receiving, the verbalized query response including audio data corresponding to the received textual response, the text-to-speech synthesis engine being selected from one or more interchangeable speech processing engines included in the profile.

4. The method of claim 2, further comprising:

receiving, prior to receiving data characterizing the utterance of the query, an input to a web site provided via a web browser configured on the first computing device, the input causing the web browser to be authenticated and registered at a second computing device coupled to the first computing device via a network.

5. The method of claim 4, further comprising:

receiving, by the second computing device, validation data associated with the first computing device, the validation data including audio and graphical rendering settings configured on with the first computing device;

generating, in response to confirming the validation data, an initial conversation prompt by the second computing device and providing the initial conversation prompt to the web site configured on the first computing device;

receiving, at an input device coupled to the first computing device and in response to providing the initial conversation prompt via the web site, the data characterizing the utterance of the query, the query associated with an item available via the web site;

transmitting the provided verbalized query response to the first computing device; and providing the verbalized query response to the first user via an output device coupled to the first computing device.

6. The method of claim 1, further comprising providing one or more applications on the first computing device based on the application identifier included in the profile, the first computing device configured to receive the utterance from a user and communicably coupled to the multitenant remote server.

7. The method of claim 1, wherein processing the text string characterizing the query further comprises:

generating a sematic interpretation associated with the text string, the semantic interpretation generated using at least one of a plurality of classification algorithms trained using a first machine learning process associated with the first tenant, determining a first contextual sequence associated with text string based on one or more previously processed text strings;

generating a first response action based on the determined first contextual sequence; and generating the textual response based on the generated first response action.

8. The method of claim 7, wherein the semantic interpretation is generated using a first data structure representing the first lexicon associated with the first tenant.

9. The method of claim 8, wherein the first data structure is generated based on interactive user data associated with a first item included in a catalog of items associated with the first tenant.

10. The method of claim 9, wherein generating the first data structure includes determining one or more attributes associated with the first item from the catalog of items;

determining one or more synonyms associated with the first item from the catalog of items;

determining one or more referring expressions associated with the first item from the catalog of items and/or the interactive user data associated with the first item; and generating the first data structure based on the determining steps, the first data structure including a name, one or more attributes, one or more synonyms, one or more referring expressions, and/or one or more dialogs corresponding to the first item.

11. The method of claim 8, wherein the first data structure is generated based on the profile and includes data corresponding to a catalog of items associated with the first tenant, the catalog including a first item title and a first item description.

12. The method of claim 8, wherein the first data structure is generated based on one or more reviews associated with a first item included in a catalog of items associated with the first tenant.

13. The method of claim 7, wherein the first data structure is used in the first machine learning process to train the at least one of a plurality of classification algorithms.

14. The method of claim 1, further comprising:

receiving second data characterizing an utterance of a query associated with the second tenant;

providing, to a second automated speech recognition engine, the received second data and a profile selected from a plurality of profiles based on the second tenant, the profile configuring the second automated speech recognition engine to process the received second data;

receiving, from the automated speech recognition engine, a text string characterizing the query; and processing, via a second instance of an executable natural language resource including a second instance of an executable natural language agent ensemble configured based on the second data and the second tenant, wherein the second instance of the executable natural language agent ensemble is configured to receive the text string characterizing the query to determine a textual response to the query, the textual response including at least one word from a second lexicon associated with the second tenant.

15. The method of claim 14, further comprising:

subsequent to the receiving of the second data characterizing the utterance of the query associated with the second tenant, deploying the second instance of the executable natural language resource including the second instance of the executable natural language agent ensemble within the multitenant remote server;
reconfiguring the profile to modify the configuration settings to specify the second instance of the executable natural language agent ensemble and associated configuration settings; and
processing the second query using the reconfigured profile and the deployed second instance of the executable natural language agent ensemble.

16. The method of claim 1, wherein the utterance of the query includes a plurality of natural language words spoken by a user and received by an input device of the first computing device, the utterance of the query provided by the user in regard to a first context associated with a first item provided by the first tenant.

17. The method of claim 16, wherein the profile includes one or more configuration settings associated with an executable instance of an executable natural language agent ensemble configured on a server including a data processor, one or more configuration settings associated with an executable instance of an executable natural language agent ensemble configured on the first computing device, and one or more configuration settings specifying one or more speech processing engines configured on the server including the data processor.

18. The method of claim 1, wherein the first tenant includes at least one of a retail entity, a service provider entity, a financial entity, a manufacturing entity, an entertainment entity, an information storage entity, and a data processing entity.

19. The method of claim 1, wherein the automated speech recognition engine is configured to receive audio data corresponding to the utterance of the query and to generate, in response to the receiving, the text string including textual data corresponding to the received audio data, the automatic speech recognition engine being selected from one or more inter-changeable speech processing engines included in the profile.

20. The method of claim 1, wherein the data characterizing the utterance of the query associated with the first tenant is provided via a textual interaction modality or via a speech interaction modality.

21. The method of claim 1, wherein the user is an end user and the tenant is a registered business user of the multitenant remote server.

22. The method of claim 1, wherein the multitenant remote server is a cloud computing server of an infrastructure-as-a-service (IaaS) and capable of supporting platform-as-a-service (PaaS) and software-as-a-service (SaaS) services.

23. The system of claim 1, wherein the profile is stored in a memory of the first computing device and transmitted to the multitenant remote service with the data characterizing the utterance of the query.

24. A system comprising:
at least one data processor; and
memory storing instructions, which, when executed by the at least one data processor cause the at least one data processor to perform operations comprising:
  receiving, by a multitenant remote server providing infrastructure for deployment of executable instances of natural language resources and for use by multiple tenants, data characterizing an utterance of a query by a first user and associated with a first tenant, the first tenant including an entity different than the first user and providing at least one of services or products to users, the multitenant remote server capable of dynamically allocating executable instances of natural language resources among the multiple tenants and including a tenant portal configured to provide the first user associated with the first tenant customization of reporting, graphical analysis of analytic trend data, account management, branding themes, user interface designs, instantiations of customer data, and customized executable natural language agent ensembles;
  deploying, responsive to the receiving and within the multitenant remote server, a first instance of an executable natural language resource including a first instance of an executable natural language agent ensemble associated with the data and the first tenant, the first instance of the executable natural language agent ensemble configured to receive a text string characterizing the query and determine a textual response to the query;
  providing, to an automated speech recognition engine and using at least the multitenant remote server, the received data and a profile selected from a plurality of profiles based on the first tenant, the profile generated and distributed within the multitenant remote server via the tenant portal, wherein the profile automatically configures the automated speech recognition engine to process the received data using a first lexicon associated with the first tenant, the profile including a registered tenant identifier identifying the first tenant as an authorized user of the multitenant remote server and an application identifier identifying one or more applications to be configured on a computing device at which the data characterizing the utterance of the query is initially received, wherein the plurality of profiles include a second profile associated with a second tenant;
  receiving, from the automated speech recognition engine and by the multitenant remote server, a text string characterizing the query; and
  processing, via the first instance of the executable natural language agent ensemble, the text string characterizing the query to determine a textual response to the query, the textual response including at least one word from the first lexicon associated with the first tenant.

25. The system of claim 24, the operations further comprising:
providing, to a text-to-speech synthesis engine, the textual response and the profile;
receiving, from the text-to-speech synthesis engine, a verbalized query response determined by the text-to-speech synthesis engine based on the textual response; and
providing the verbalized query response.

26. The system of claim 25, wherein the multitenant remote server is configured in a single server including the at least one data processor and the memory, and further includes a tenant portal through which the first tenant can customize an attribute of the text-to-speech synthesis engine.

27. The system of claim 26, wherein the attribute includes a voice or a dialect for use in the verbalized query response.

28. The system of claim 24, wherein additional instances of executable natural language resources can be dynamically provisioned within the multitenant remote server responsive to increasing amounts of data characterizing utterances of queries received from additional users.

29. A non-transitory computer readable medium storing instructions, which, when executed by at least one data processor causes the at least one data processor to perform operations comprising:

receiving, by a multitenant remote server providing infrastructure for deployment of executable instances of natural language resources and for use by multiple tenants, data characterizing an utterance of a query by a first user and associated with a first tenant, the first tenant including an entity different than the first user and providing at least one of services or products to users, the multitenant remote server capable of dynamically allocating executable instances of natural language resources among the multiple tenants and including a tenant portal configured to provide the first user associated with the first tenant customization of reporting, graphical analysis of analytic trend data, account management, branding themes, user interface designs, instantiations of customer data, and customized executable natural language agent ensembles;

deploying, responsive to the receiving and within the multitenant remote server, a first instance of an executable natural language resource including a first instance of an executable natural language agent ensemble associated with the data and the first tenant, the first instance of the executable natural language agent ensemble configured to receive a text string characterizing the query and determine a textual response to the query;

providing, to an automated speech recognition engine and using at least the multitenant remote server, the received data and a profile selected from a plurality of profiles based on the first tenant, the profile generated and distributed within the multitenant remote server via the tenant portal, wherein the profile automatically configures the automated speech recognition engine to process the received data using a first lexicon associated with the first tenant, the profile including a registered tenant identifier identifying the first tenant as an authorized user of the multitenant remote server and an application identifier identifying one or more applications to be configured on a computing device at which the data characterizing the utterance of the query is initially received, wherein the plurality of profiles includes a second profile associated with a second tenant;

receiving, from the automated speech recognition engine and by the multitenant remote server, a text string characterizing the query; and processing, via the first instance of the executable natural language agent ensemble, the text string characterizing the query to determine a textual response to the query, the textual response including at least one word from the first lexicon associated with the first tenant.

* * * * *